(12) United States Patent
Chae et al.

(10) Patent No.: US 8,489,323 B2
(45) Date of Patent: Jul. 16, 2013

(54) METHOD FOR CONTROLLING A MAP VIA A MOBILE TERMINAL

(75) Inventors: Myung-joo Chae, Seoul (KR); Hyang Seok Chae, Seoul (KR); Jeongsik Mun, Seoul (KR)

(73) Assignee: LG Electronics Inc., Seoul (KR)

( * ) Notice: Subject to any disclaimer, the term of this patent is extended or adjusted under 35 U.S.C. 154(b) by 546 days.

(21) Appl. No.: 12/435,348

(22) Filed: May 4, 2009

(65) Prior Publication Data

US 2010/0125405 A1    May 20, 2010

(30) Foreign Application Priority Data

Nov. 18, 2008    (KR) .................... 10-2008-0114569

(51) Int. Cl.
*G01C 21/00*        (2006.01)

(52) U.S. Cl.
USPC ........................................... 701/418; 701/487

(58) Field of Classification Search
USPC .......................................... 701/200, 418, 487
See application file for complete search history.

(56) References Cited

U.S. PATENT DOCUMENTS

| | | | | |
|---|---|---|---|---|
| 5,559,707 A | * | 9/1996 | DeLorme et al. | 701/200 |
| 5,848,373 A | * | 12/1998 | DeLorme et al. | 701/200 |
| 6,321,158 B1 | * | 11/2001 | DeLorme et al. | 701/201 |
| 2007/0067104 A1 | * | 3/2007 | Mays | 701/211 |

* cited by examiner

*Primary Examiner* — Michael Fuelling
(74) *Attorney, Agent, or Firm* — Lee, Hong, Degerman, Kang & Waimey

(57) ABSTRACT

A method for controlling a map is provided. The method comprises displaying a map on a display module of a mobile terminal and registering a point on the map, selected by using at least one of a user input unit and a sensing unit, as a shortcut point and displaying a shortcut icon on the map.

18 Claims, 31 Drawing Sheets

41

Photograph image

FIB. 6C
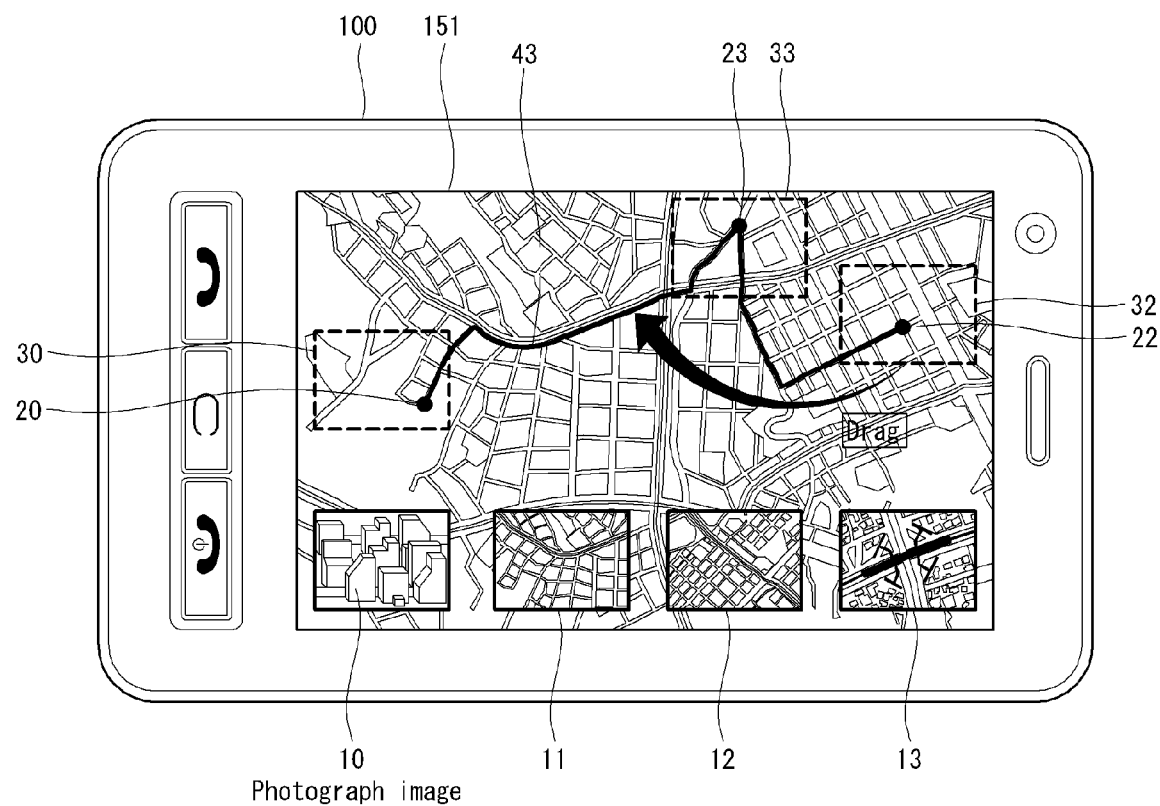

Photograph image

METHOD FOR CONTROLLING A MAP VIA A MOBILE TERMINAL

CROSS-REFERENCE TO RELATED APPLICATIONS

Pursuant to 35 U.S.C. §119(a), this application claims the benefit of earlier filing date and right of priority to Korean Application No. 10-2008-0114569, filed on Nov. 18, 2008.

BACKGROUND OF THE INVENTION

1. Field of the Invention

The present application relates to a method for controlling a map and a mobile terminal using the same.

2. Discussion of the Related Art

As the function of a terminal such as a personal computer, a notebook computer or a cellular phone is diversified, the terminal is implemented in the form of a multimedia player having various functions. Examples of such functions include capturing pictures or video, playing music or video files, playing games, receiving broadcasting programs, etc.

The terminal can be classified into a mobile terminal and a stationary terminal according to mobility. The mobile terminal can be divided into a handheld terminal and a vehicle mount terminal according to whether a user can carry the mobile terminal.

It can be considered to improve the structural and/or software part of a terminal in order to support and enhance the function of the terminal. As a variety of terminals including the mobile terminal provide complex and various functions, a user interface (UI) including menu display and list display becomes complicated. Recently, the mobile terminal has provided map graphic images to improve user's convenience.

The mobile terminal can have a shortcut function to rapidly change a map image according to user's choice. The shortcut function can be provided in the form of a text icon. Shortcut registration includes a process of selecting a point that a user wants to register as a shortcut point from a map displayed on the mobile terminal, a process of inputting a shortcut registration key signal to execute a shortcut registration application so as to display a shortcut registration menu and receive a user input and a process of registering and storing a shortcut point selected by the user from the shortcut registration menu. However, the shortcut registration provided by the mobile terminal requires the aforementioned multiple steps, and thus it is inconvenient for the user. Since a shortcut point is displayed in the form of text information, only restricted information is provided due to the limitations of the text information and a user cannot use the information immediately and conveniently.

When the user selects a shortcut menu, the mobile terminal displays previously registered shortcut points in the form of a text list. When the user selects a desired shortcut point from the shortcut list, the mobile terminal moves a map image displayed thereon to the shortcut point selected by the user. Furthermore, the mobile terminal can provide a function of displaying a route on the map. To use this function, the user is required to repeat a process of executing a passing-through point adding application in the mobile terminal and a process of selecting an intermediate passing-through point from a passing-through point addition menu.

SUMMARY OF THE INVENTION

It is an object of the present application to provide a method for controlling a map, which simplifies a shortcut registration process, improves immediacy of shortcut, provides a wide range of shortcut information and minimizes the number of steps of processes of searching a route, adding and changing a passing-through point and a mobile terminal using the same.

According to an aspect of the present application, there is provided a method for controlling a map, the method comprising displaying a map on a display module of a mobile terminal; and registering a point on the map, selected by using at least one of a user input unit and a sensing unit, as a shortcut point and displaying a shortcut icon on the map.

According to another aspect of the present application, there is provided a mobile terminal comprising a display module displaying a map and a shortcut icon together; a user input unit and a sensing unit receiving a user input; and a controller registering a point selected by using at least one of the user input unit and the sensing unit as a shortcut point and generating the short cut icon.

BRIEF DESCRIPTION OF THE DRAWINGS

The above and other aspects, features, and advantages of the present application will become more apparent upon consideration of the following description of preferred embodiments, taken in conjunction with the accompanying drawing figures.

FIGS. 6A, 6B, 6C and 6D illustrate an example of searching a route using a shortcut icon;

DETAILED DESCRIPTION OF THE PREFERRED EMBODIMENTS

In the following detailed description, reference is made to the accompanying drawing figures which form a part hereof, and which show by way of illustration specific embodiments of the present application. It is to be understood by those of ordinary skill in this technological field that other embodiments may be utilized, and structural, electrical, as well as procedural changes may be made without departing from the scope of the present application. Wherever possible, the same reference numbers will be used throughout the drawings to refer to the same or similar parts.

Hereinafter, a mobile terminal relating to the present application will be described below in more detail with reference to the accompanying drawings. In the following description, suffixes "module" and "unit" are given to components of the mobile terminal in consideration of only facilitation of description and do not have meanings or functions discriminated from each other.

The mobile terminal may be implemented using a variety of different types of terminals. Examples of such terminals include mobile phones, smart phones, notebook computers, digital broadcast terminals, personal digital assistants (PDA), portable multimedia players (PMP) and navigators.

Figure 1:
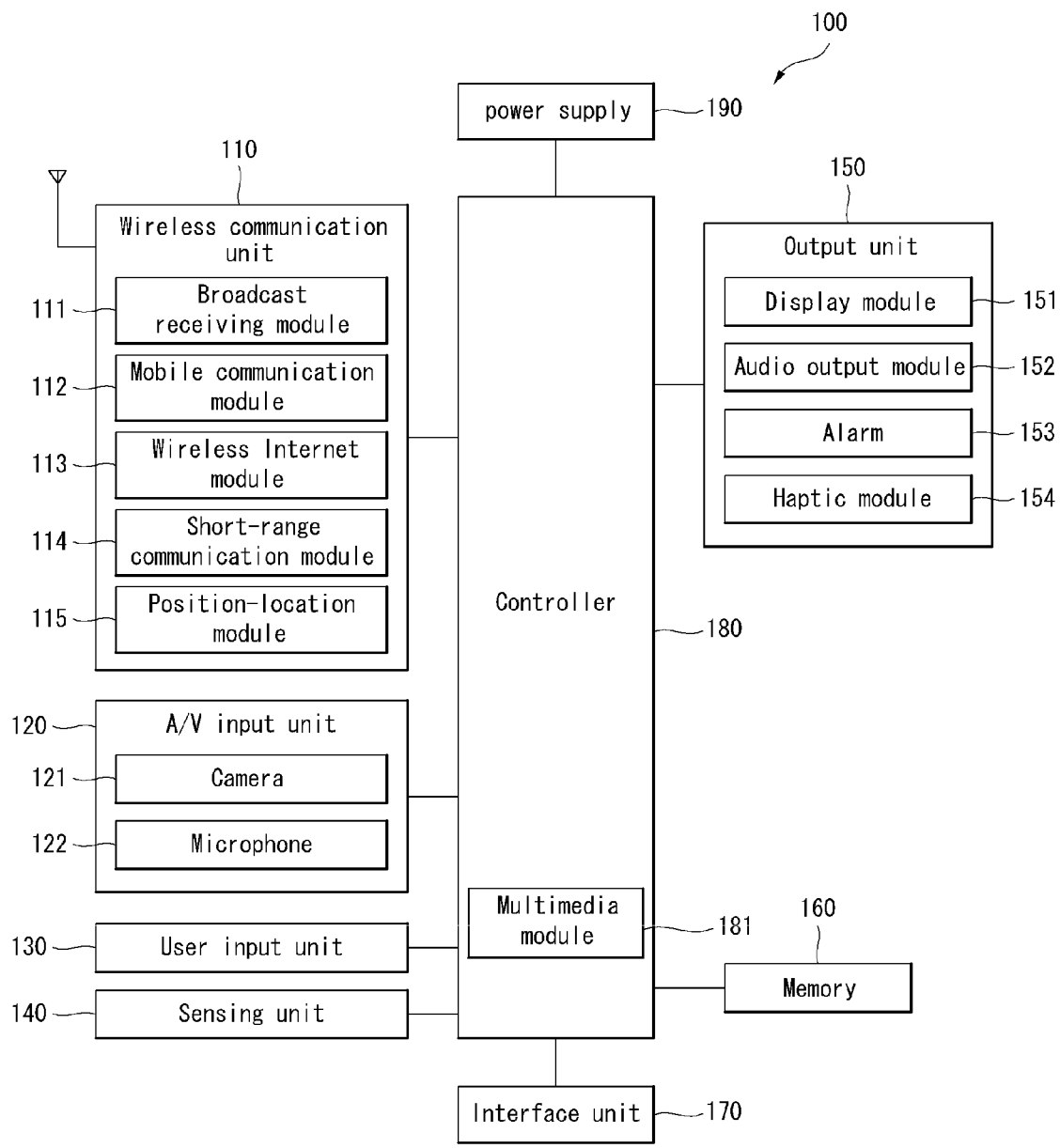
FIG. 1 is a block diagram of a mobile terminal according to an embodiment of the present application.

FIG. 1 is a block diagram of a mobile terminal 100 in accordance with an embodiment of the present application. By way of non-limiting example only, further description will be with regard to a mobile terminal. However, such teachings apply equally to other types of terminals. Referring to FIG. 1, the mobile terminal 100 can include a wireless communication unit 110, an audio/video (A/V) input unit 120, a user input unit 130, a sensing unit 140, an output unit 150, a memory 160, an interface unit 170, a controller 180, and a power supply 190. It is understood that implementing all of the illustrated components is not a requirement. Greater or fewer components may alternatively be implemented.

The wireless communication unit 110 can be configured with several commonly implemented components. For instance, the wireless communication unit 110 typically includes one or more components which permits wireless communication between the mobile terminal 100 and a wireless communication system or network within which the mobile terminal is located. For example, the wireless communication unit 110 may include a broadcast receiving module 111, a mobile communication module 112, a wireless Internet module 113, a short-range communication module 114 and a position-location module 115.

The broadcast receiving module 111 receives a broadcast signal and/or broadcast associated information from an external broadcast managing entity via a broadcast channel. The broadcast channel may include a satellite channel and a terrestrial channel. The broadcast managing entity may refer generally to a server which generates and transmits a broadcast signal and/or broadcast associated information or a server which receives a previously generated broadcast signal and/or broadcast associated information and provides the broadcast signal and/or broadcast associated information to a terminal. The broadcast signal may be implemented as a TV broadcast signal, a radio broadcast signal, and a data broadcast signal, among others. If desired, the broadcast signal may further include a broadcast signal combined with a TV or radio broadcast signal. Examples of broadcast associated information include information associated with a broadcast channel, a broadcast program, a broadcast service provider, etc. The broadcast associated information can be provided through a mobile communication network. In this case, the broadcast associated information can be received by the mobile communication module 112. For instance, the broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T).

The broadcast signal and/or broadcast associated information received through the broadcast receiving module 111 may be stored in a suitable device, such as the memory 160.

The mobile communication module 112 transmits/receives wireless signals to/from one or more network entities (e.g., base station, Node-B). Such signals may represent audio, video, multimedia, control signaling, and data, among others.

The wireless internet module 113 supports Internet access for the mobile terminal. This module may be internally or externally coupled to the terminal. The wireless Internet module 113 can use wireless LAN (WLAN) (Wi-Fi), wireless broadband (Wibro), world interoperability for microwave access (Wimax), high speed downlink packet access (HSDPA), etc. as wireless Internet technology.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal. A global positioning system (GPS) module is a representative example of the position information module 115. According to the current technology, the GPS module 115 can calculate information on distances between one point (object) and at least three satellites and information on the time when the distance information is measured and apply trigonometry to the obtained distance information to obtain three-dimensional position information on the point (object) according to latitude, longitude and altitude at a predetermined time. Furthermore, a method of calculating position and time information using three satellites and correcting the calculated position and time information using another satellite is also used. In addition, the GPS module 115 continuously calculates the current position in real time and calculates velocity information using the position information.

The mobile terminal 100 can receive map data through the broadcast receiving module 111, the mobile communication module 112, the wireless Internet module 113, the short-range communication module 114, and the position-location module 115 and store the map data in the memory 160.

The audio/video (A/V) input unit 120 is configured to provide audio or video signal input to the mobile terminal. As shown, the A/V input unit 120 includes a camera 121 and a microphone 122. The camera 121 receives and processes image frames of still pictures or video obtained by an image sensor in a video telephony mode or a photographing mode. Image frames processed by the camera 121 can be displayed on a display unit 151.

Image frames processed by the camera 121 can be stored in the memory 160 or transmitted to an external device through the wireless communication unit 110. The mobile terminal 100 may include at least two cameras.

The microphone 122 receives an external audio signal while the mobile terminal is in a particular mode, such as phone call mode, recording mode and voice recognition mode. This audio signal is processed and converted into digital data. The portable device, and in particular, A/V input unit 120, typically includes assorted noise removing algorithms to remove noise generated in the course of receiving the external audio signal. Data generated by the A/V input unit 120 may be stored in the memory 160, utilized by the output unit 150, or transmitted via one or more modules of communication unit 110. If desired, two or more microphones and/or cameras may be used.

The user input unit 130 generates input data responsive to user manipulation of an associated input device or devices. Examples of such devices include a keypad, a dome switch, a touchpad (e.g., static pressure/capacitance), a jog wheel and a jog switch. A specific example is one in which the user input unit 130 is configured as a touchpad in cooperation with a touch screen display (which will be described in more detail below).

The sensing unit 140 provides status measurements of various aspects of the mobile terminal 100. For instance, the sensing unit may detect an open/close status of the mobile terminal 100, relative positioning of components (e.g., a display and keypad) of the mobile terminal, a change of position of the mobile terminal or a component of the mobile terminal, a presence or absence of user contact with the mobile terminal, orientation or acceleration/deceleration of the mobile terminal. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device.

The sensing unit 140 may include a touch screen having a touch sensor included in or formed on the display module 151 and a proximity sensor sensing a presence or absence of an object and motion or gesture of the object within a recognizable distance on the display module 151 or the touch screen. Furthermore, the sensing unit 140 may include a gyro sensor and a terrestrial magnetic sensor which sense variations in the position, orientation and angle of the mobile terminal 100.

The output unit 150 generally includes various components which support the output requirements of the mobile terminal. The output unit 150 may include the display module 151, an audio output module 152, an alarm 153 and a haptic module 154.

The display module 151 is typically implemented to visually display information associated with the mobile terminal 100. For instance, if the mobile terminal is operating in a phone call mode, the display will generally provide a user interface or graphical user interface which includes information associated with placing, conducting, and terminating a phone call. As another example, if the mobile terminal 100 is in a video call mode or a photographing mode, the display 151 may additionally or alternatively display images which are associated with these modes.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal may include one or more of such displays. An example of a two-display embodiment is one in which one display is configured as an internal display (viewable when the terminal is in an opened position) and a second display configured as an external display (viewable in both the open and closed positions).

The display module 151 can include at least two display units 151 which are physically or logically divided. For instance, the mobile terminal 100 can include a plurality of displays that are arranged on a single face at a predetermined distance or integrated. Otherwise, the plurality of displays can be arranged on different sides.

One particular implementation includes the display module 151 configured as a touch screen working in cooperation with an input device, such as a touchpad. This configuration permits the display module to function both as an output device and an input device. In the case where the display unit 151 and a sensor sensing touch (referred to as a touch sensor hereinafter) form a layered structure, which is referred to as a touch screen hereinafter, the display unit 151 can be used as an input device in addition to an output device. The touch sensor can be in the form of a touch film, a touch sheet and a touch pad, for example.

The touch sensor can be constructed such that it converts a variation in pressure applied to a specific portion of the display unit 151 or a variation in capacitance generated at a specific portion of the display unit 151 into an electric input signal. The touch sensor can be constructed such that it can sense pressure of touch as well as the position and area of touch.

When touch input is applied to the touch sensor, a signal corresponding to the touch input is transmitted to a touch controller. The touch controller processes the signal and transmits data corresponding to the processed signal to the controller 180. Accordingly, the controller 180 can detect a touched portion of the display module 151. A capacitive touch screen is constructed such that proximity of a pointer is detected through a variation in an electric field according to the proximity of the pointer. In this case, the touch screen (touch sensor) can be classified as a proximity sensor.

A proximity sensor can be located in an internal region of the mobile terminal, surrounded by the touch screen, or near the touch screen. The proximity sensor senses an object approaching a predetermined sensing face or an object located near the proximity sensor using electromagnetic force or infrared rays without having mechanical contact. The proximity sensor has lifetime longer than that of a contact sensor and has wide application. The proximity sensor includes a transmission type photo-electric sensor, a direct reflection type photo-electric sensor, a mirror reflection type photo-electric sensor, a high-frequency oscillating proximity sensor, a capacitive proximity sensor, a magnetic proximity sensor, an infrared proximity sensor, etc.

The proximity sensor senses proximity touch and a proximity touch pattern (for example, a proximity touch distance, a proximity touch direction, a proximity touch velocity, a proximity touch time, a proximity touch position, a proximity touch moving state, etc.). Information corresponding to the sensed proximity touch action and proximity touch pattern can be displayed on the touch screen.

The audio output module 152 can output audio data received from the wireless communication unit 110 or stored in the memory 160 in a call signal receiving mode, a telephone call mode or a recording mode, a speech recognition mode and a broadcasting receiving mode. The audio output module 152 outputs audio signals related to functions (for example, a call signal incoming tone, a message incoming tone, etc.) performed in the mobile terminal 100. The audio output module 152 can include a receiver, a speaker, a buzzer, etc.

The alarm 153 outputs a signal for indicating generation of an event of the mobile terminal 100. Examples of events generated in the mobile terminal include receiving of a call signal, receiving of a message, receiving of e-mail, input of a key signal, input of touch, input of proximity touch, etc. The alarm 153 can output signals in forms different from video signals or audio signals, for example, a signal for indicating generation of an event through vibration. The video signals or the audio signals can be also output through the display unit 151 or the audio output module 152. The alarm 153 can output an effective sound or a vibration pattern previously stored in the memory 160 when the user selects a point to be registered as a shortcut, selects a route searching point or an intermediate passing-through point on a map displayed on the display module 151.

The haptic module 154 generates various haptic effects that the user can feel. A representative example of the haptic effects is vibration. The intensity and pattern of vibration generated by the haptic module 154 can be controlled. For example, different vibrations can be combined and output or sequentially output. The haptic module 154 can generate a variety of haptic effects including an effect of stimulus according to arrangement of pins vertically moving for a contact skin face, an effect of stimulus according to jet force or sucking force of air through a jet hole or a sucking hole, an effect of stimulus rubbing the skin, an effect of stimulus according to contact of an electrode, an effect of stimulus using electrostatic force and an effect according to reproduction of cold and warmth using an element capable of absorbing or radiating heat in addition to vibrations. The haptic module 154 can not only transmit haptic effects through direct contact but also allow the user to feel haptic effects through kinesthetic sense of his fingers or arms. The haptic module 154 can output a haptic pattern previously stored in the memory 160 when the user selects a point to be registered as a shortcut, selects a route searching point or an intermediate passing-through point on the map displayed on the display module 151.

The memory 160 is generally used to store various types of data to support the processing, control, and storage requirements of the mobile terminal. Examples of such data include program instructions for applications operating on the mobile terminal, contact data, phonebook data, messages, e-mail, pictures, video, etc. The memory 160 can store data about various effective sounds, vibration patterns and haptic patterns which are output when user input or an event is generated. The memory 160 may be implemented using any type (or combination) of suitable volatile and non-volatile memory or storage devices including flash memory, hard disk, multimedia card micro type memory, card type memory (for example, SD or XD memory), random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device. The mobile terminal 100 may be operated in association with a web storage which performs the storing function of the memory 160 on the Internet.

The interface unit 170 is often implemented to couple the mobile terminal 100 with external devices. The interface 170 receives data from the external devices or power and transmits the data or power to the internal components of the mobile terminal 100 or transmits data of the mobile terminal 100 to the external devices. The interface 170 can include a wired/wireless headset port, an external charger port, a wired/wireless data port, a memory card port, a port for connecting a device having a user identification module, an audio I/O port, a video I/O port, an earphone port, etc. The interface 170 can serve as a path through which power from an external cradle is provided to the mobile terminal 100 when the mobile terminal 100 is connected to the external cradle or a path through which various command signals inputted by the user through the cradle to the mobile terminal 100. The various command signals or power input from the cradle can be used as a signal for confirming whether the mobile terminal 100 is correctly set in the cradle.

An identification module is a chip that stores information for authenticating the authority to use the mobile terminal 100 and can include a user identify module (UIM), a subscriber identify module (SIM) and a universal subscriber identify module (USIM). A device (referred to as an identification device hereinafter) including the identification module can be manufactured in the form of a smart card. Accordingly, the identification device can be connected to the mobile terminal 100 through a port. The identification module stores telephone numbers, call information, charging information, etc.

The controller 180 typically controls the overall operations of the mobile terminal. For instance, the controller performs the control and processing associated with voice calls, data communications, video calls, transmitting and receiving messages. If desired, the controller 180 may include a 3D image processing module (not shown) and a multimedia module 181 which provides multimedia playback. The 3D image processing module can convert 3D data such as 3D map data and 3D user interface data into 3D images and adjust the angle and size of a 3D image displayed on the display module 151 according to a direction change command input by the user or a variation in the angle of the mobile terminal 100. The multimedia module 181 processes signals for playback of multimedia data. The controller 180 can perform pattern recognition to respectively recognize handwriting and picture-drawing input through the touch screen as characters and an image.

The controller 180 displays a map image on the display module 151 according to user's choice and controls operations including shortcut registration processed on the map image, shortcut registration performed in association with a photograph/video album, route search and addition of a passing-through point.

The power supply 190 provides power required by the various components for the mobile terminal. The provided power may be internal power, external power, or combinations thereof.

Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments are implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in a memory (for example, memory 160), and executed by a controller or processor (for example, controller 180).

Figure 2A:
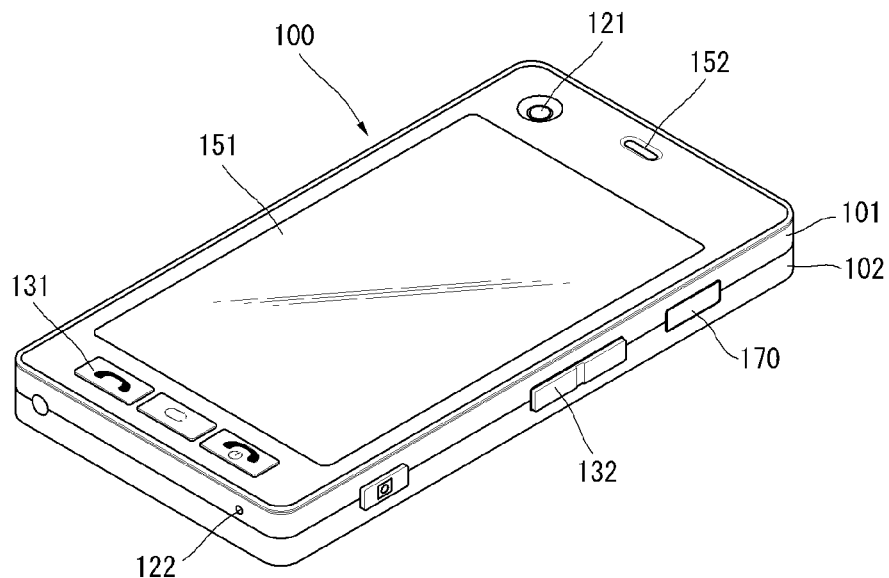
FIG. 2A is a perspective view of a front side of a mobile terminal according to an embodiment of the present application.
Figure 2B:
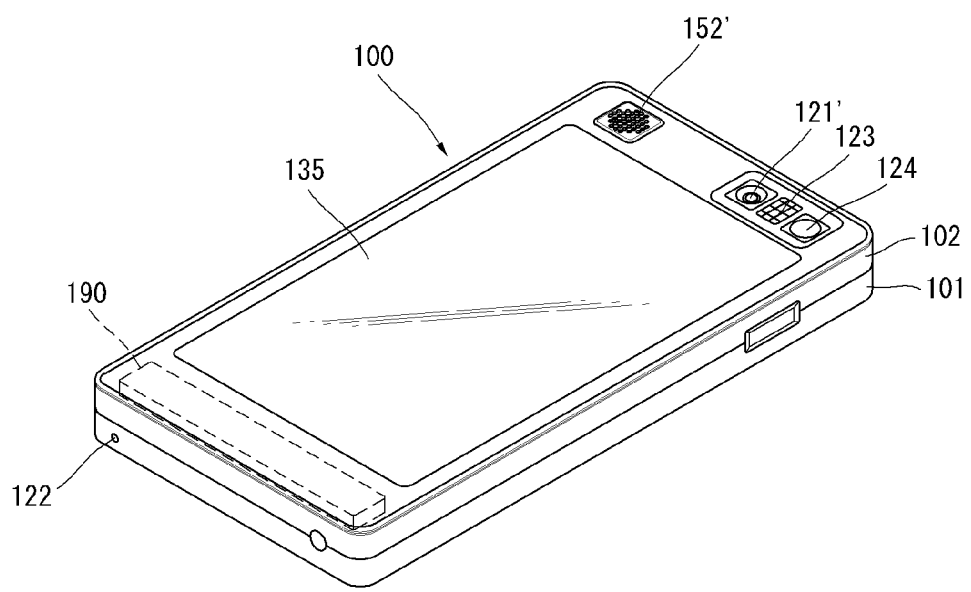
FIG. 2B is a rear view of the mobile terminal shown in FIG. 2A.

FIG. 2A is a perspective view of a front side of the mobile terminal 100 and FIG. 2B is a perspective view of a rear side of the mobile terminal 100.

Referring to FIG. 2A, the body of the mobile terminal 100 includes a case (a casing, a housing, a cover, etc.) forming the exterior of the terminal 100. The case can be divided into a front case 101 and a rear case 102. Various electronic components are arranged in the space formed between the front case 101 and the rear case 102. If desired, one or more intermediate cases may be provided between the front case 101 and the rear case 102.

The front and rear cases 101 and 102 are usually formed from a suitably ridge material such as injection molded plastic, or formed using metallic material such as stainless steel (STS) and titanium (Ti).

The display unit 151, the audio output unit 152, the camera 121, a plurality of operating units 131 and 132 of the user input unit 130, the microphone 122 and the interface unit 170 can be arranged in the front case 101.

The display unit 151 occupies most part of the main face of the front case 101. The audio output unit 152 and the camera 121 are arranged in a region in proximity to one of both ends of the display unit 151 and the first operating unit 131 and the microphone 122 are located in a region in proximity to the other end of the display unit 151. The second operating unit 132 and the interface 170 are arranged on the sides of the front case 101 and the rear case 102.

The user input unit 130 is operated to receive commands for controlling the operation of the mobile terminal 100 and can include the plurality of operating units 131 and 132. The operating units 131 and 132 can employ any tactile manner in which a user operates the operating units 131 and 132 while having tactile feeling. For instance, the operating units 131 and 132 can include a key pad, a dome switch, a touch pad, a jog wheel, a jog switch, a track ball, a joystick, etc.

The first and second operating units 131 and 132 can receive various inputs. For example, the first operating unit 131 receives commands such as start, end and scroll and the second operating unit 132 receives commands such as control of the volume of sound output from the audio output unit 152 and conversion of the display unit 151 to a touch recognition mode. The operating units 131 and 132 can include a key designated for map display and an operating unit for selecting and controlling an object of a map.

Referring to FIG. 2B, a camera 121' can be additionally attached to the rear case 102. The camera 121' has a photographing direction opposite to that of the camera 121 shown in FIG. 2A and can have pixels different from those of the camera 121 shown in FIG. 2A.

For instance, it is desirable that the camera 121 has low pixels such that it can capture an image of the face of a user and transmit the image to a receiving part in case of video call while the camera 121' has high pixels because it captures an image of a general object and does not immediately transmit the image in many cases. The cameras 121 and 121' can be attached to the terminal body such that they can be rotated or pop-up.

A flash 123 and a mirror 124 are additionally arranged in proximity to the camera 121'. The flash 123 lights an object when the camera 121' takes a picture of the object. The mirror 124 is used for the user to look at his/her face in the mirror when the user wants to self-photograph himself/herself using the camera 121'.

The rear case 102 also includes an audio output module 152 configured as a speaker. If desired, the audio output modules 152 and 152' of the front and rear cases 101 and 102 may cooperate to provide stereo output. Moreover, either or both of these audio output modules may be configured to operate as a speakerphone.

A broadcast signal receiving antenna 124 is shown located on the side of the terminal body. The broadcast signal receiving antenna 124 functions in cooperation with the broadcast receiving module 111 (FIG. 1). If desired, the antenna 124 may be fixed or configured to retract into the body of the mobile terminal 100.

The power supply 190 for providing power to the mobile terminal 100 is located in the terminal body. The power supply 190 can be included in the terminal body or detachably attached to the terminal body.

A touch pad 135 for sensing touch can be additionally attached to the rear case 102. The touch pad 135 can be of a light transmission type as the display unit 151. If the display unit 151 is implemented to output visual information through both sides thereof, the visual information can be recognized through the touch pad 135. The information output through both sides of the display unit 151 can be controlled by the touch pad 135. Otherwise, a display is additionally attached to the touch pad 135 such that a touch screen can be arranged even in the rear case 102.

The touch pad 135 operates in association with the display unit 151 of the front case 101. The touch pad 135 can be located in parallel with the display unit 151 behind the display unit 151. The touch pad 135 can be identical to or smaller than the display unit 151 in size.

The mobile terminal 100 is not limited to the structure shown in FIGS. 2A and 2B and may be implemented in a variety of different configurations. Examples of such configurations include folder-type, slide-type, bar-type, rotational-type, swing-type, swivel-type and combinations thereof.

Figure 3:
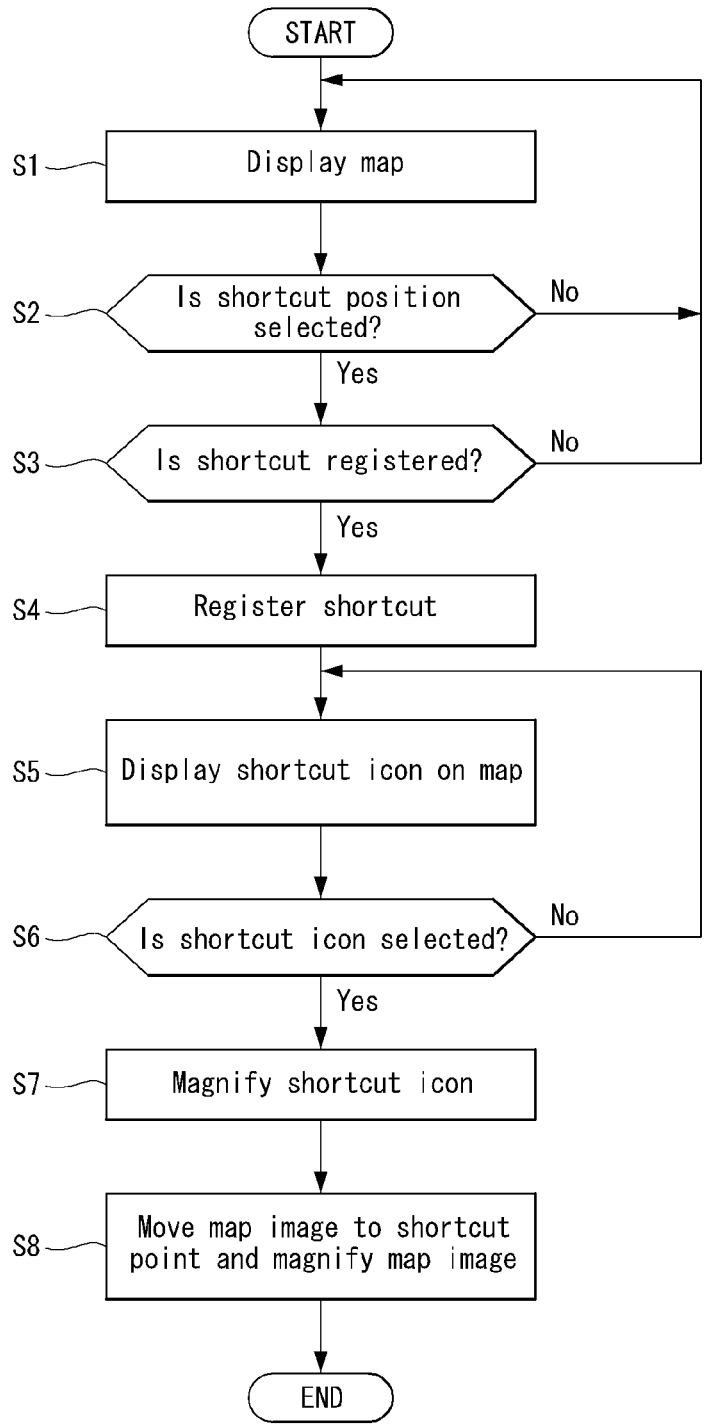
FIG. 3 is a flow chart illustrating a control process of a method for controlling a map according to an embodiment of the present application.

FIG. 3 is a flow chart showing a control process of registering shortcut and selecting a shortcut icon in a method for controlling a map according to an embodiment of the present application. The control process is performed under the control of the controller 180 illustrated in FIG. 1. The control process will be explained with reference to map images shown in FIGS. 4A, 4B, 4C and 4D.

Figure 4A:
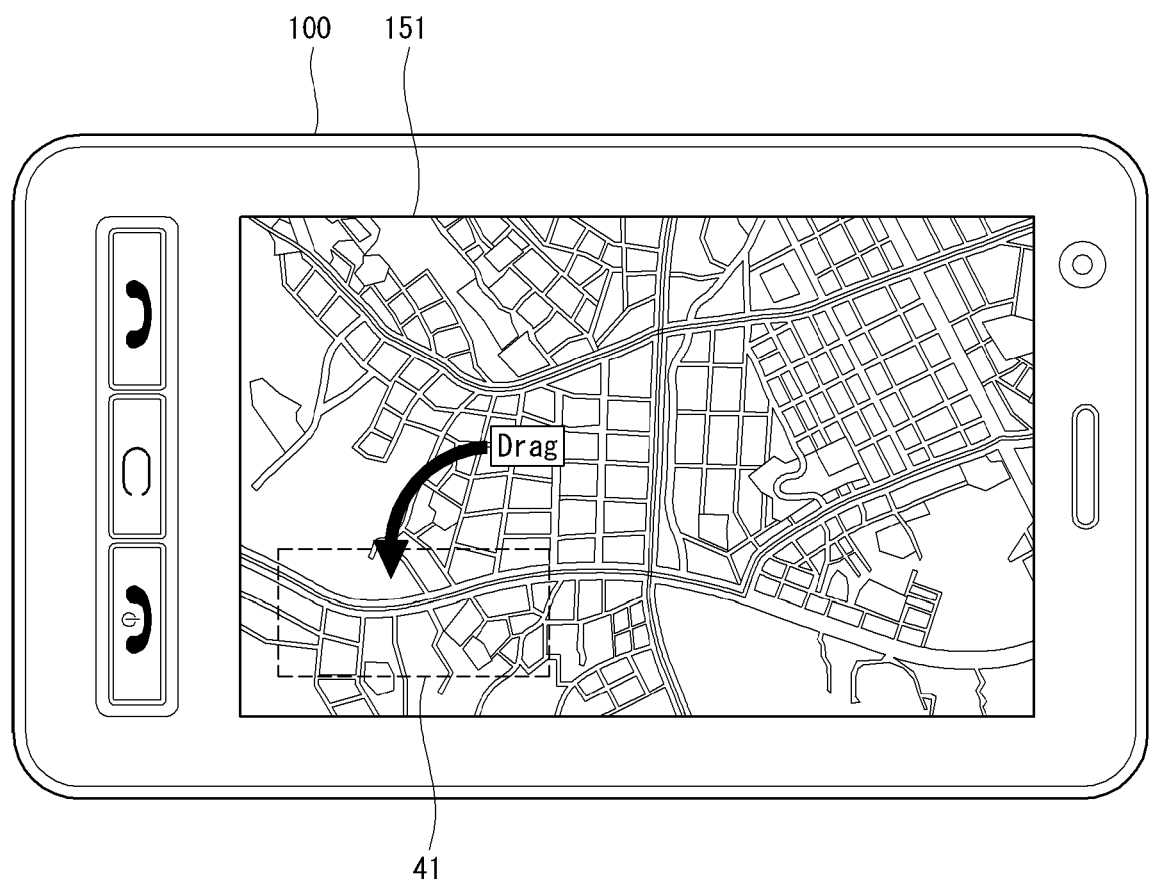
FIGS. 4A, 4B, 4C and 4D illustrate an example of a map controlling method according to shortcut registration and shortcut icon selection executed on a map.

Referring to FIG. 3, the controller 180 displays a 2D or 3D map on the display module 151 (shown in FIG. 1) according to user's choice in operation S1. The controller 180 can set a specific position of the display screen of the display module 151 as a shortcut registration position. When the user selects a desired point on the map displayed on the display module 151 through touch or proximity input and drags-and-drops the selected point to the shortcut registration position 41, as illustrated in FIG. 4A, the controller 180 executes a map shortcut registration application in operations S2, S3 and S4. Shortcut registration can be performed in a photo/video album as well as on the map.

Figure 4B:
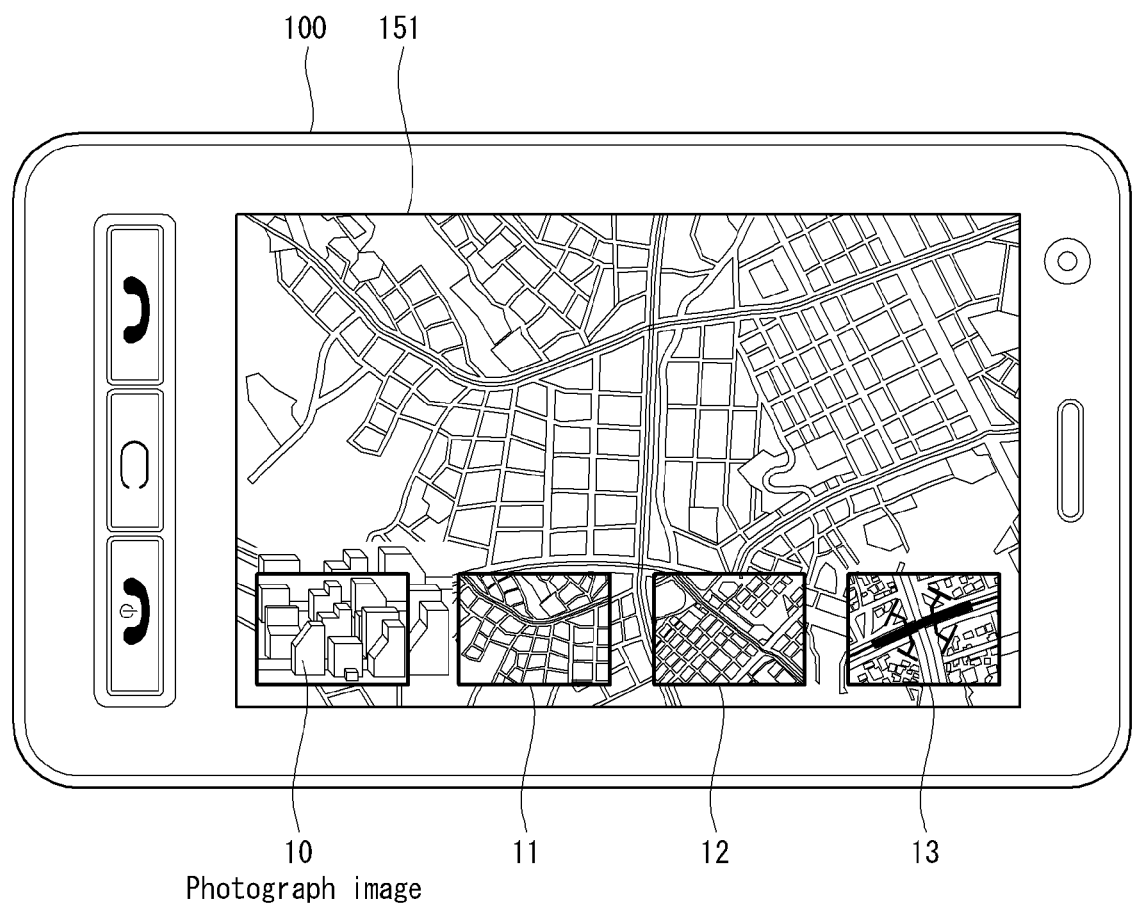

An icon indicating the shortcut point selected by the user is displayed on the map in operation S5. As illustrated in FIG. 4B, the shortcut icons 11, 12 and 13 can be indicated in the form of a part of the map, as well as a photograph 10 selected by the user, a video selected by the user, text, an additionally designed image or any combination thereof. As illustrated in FIG. 4B, the shortcut icons 10, 11, 12 and 13 can be displayed on the map in a thumbnail form. The controller 180 stores position information of the point selected by the user, for instance, GPS position information or position information included in exchange image file format (EXIF) of map image data, in a position information field of the shortcut icon. If photographs or videos stored in the mobile terminal 100 include position information, a photograph or video captured at a shortcut point can be automatically displayed as a shortcut icon.

Figure 4C:
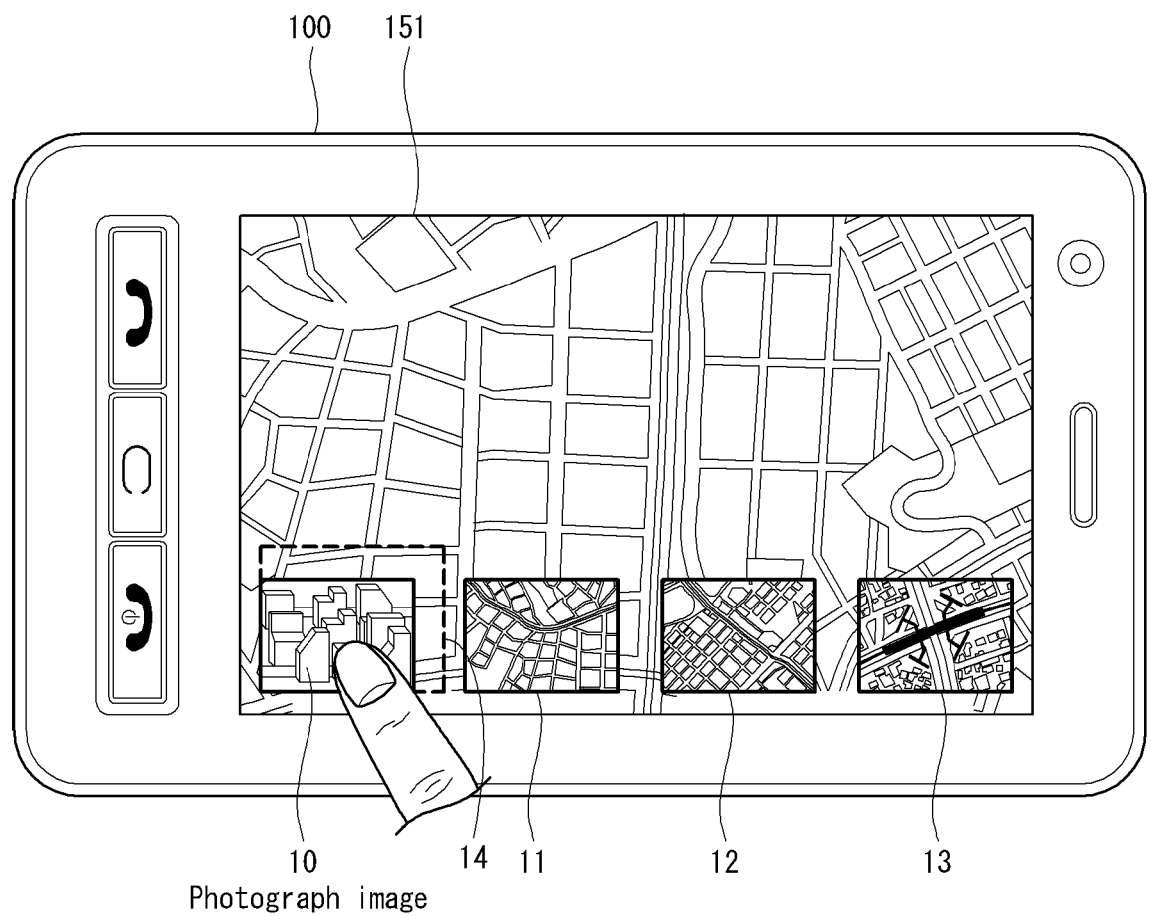

When the user selects one of the shortcut icons 10, 11, 12 and 13 displayed on the map through touch or proximity input, as illustrated in FIG. 4C, the controller 180 magnifies the selected shortcut icon 14. Additionally, the controller 180 may move and magnify the map image to display a shortcut point corresponding to position information of the selected shortcut icon on the display module 151 (FIGS. 3, S6, S7 and S8).

Figure 4D:
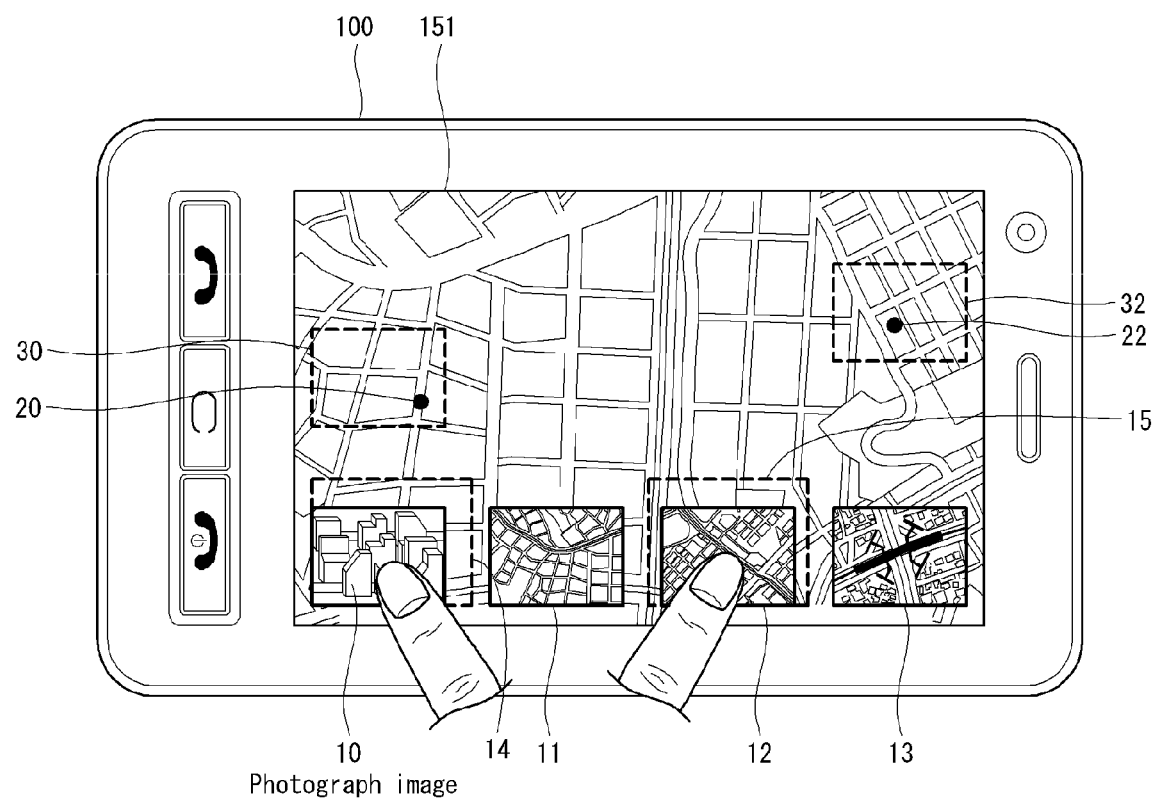

When the user selects two or more shortcut icons 14 and 15 displayed on the map at the same time or at intervals within a predetermined time, the controller 180 magnifies the selected shortcut icons 14 and 15 and adjusts the size of the map image to display shortcut points 20 and 22 respectively indicated by position information of the selected shortcut icons 10 and 12 on the display module 151, as illustrated in FIG. 4D. In FIG. 4D, the shortcut points 20 and 22 correspond to the selected shortcut icons 10 and 12 respectively. Furthermore, the shortcut points 20 and 22 may be displayed as dotted lines 30 and 32, respectively.

The controller 180 can display a pointer such as an arrow on the map. In this case, the user can move the pointer by using the user input unit 130 illustrated in FIG. 1, such as a key pad, a dome switch, a touch pad, a jog wheel, a jog switch, a track ball or a joystick, or motion of the mobile terminal 100 to select a desired point as a shortcut point in operations S2, S3 and S4. Furthermore, the user can select a shortcut icon by using the user input unit 130 or motion of the mobile terminal 100 in operation S6.

Figure 5:
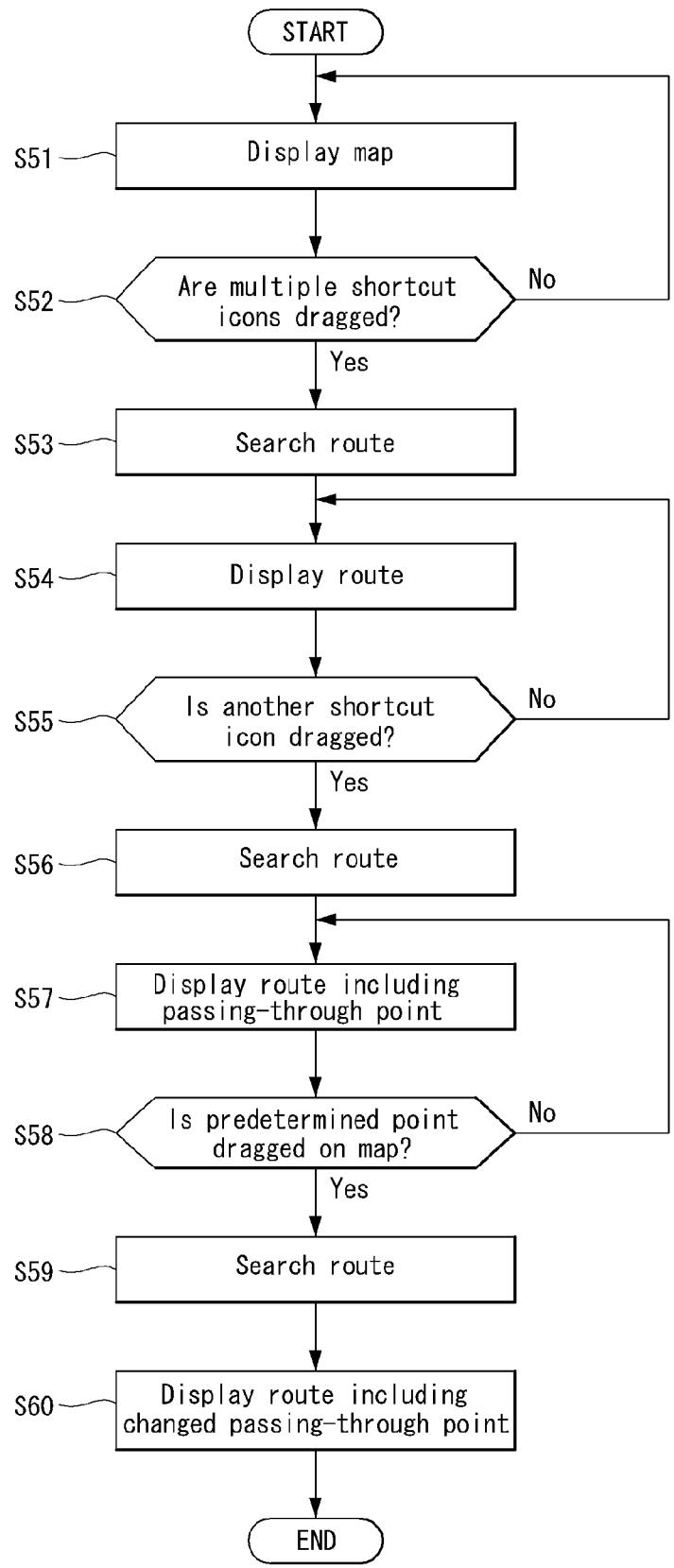
FIG. 5 is a flow chart illustrating a control process of searching a route using a shortcut icon in a method for controlling a map according to an embodiment of the present application.

FIG. 5 is a flow chart showing a control process for searching a route using a shortcut icon in the method for controlling a map according to an embodiment of the present application. The control process is performed under the control of the controller 180 illustrated in FIG. 1. The control process will be explained with reference to map images illustrated in FIGS. 6A, 6B, 6C and 6D.

Figure 6A:
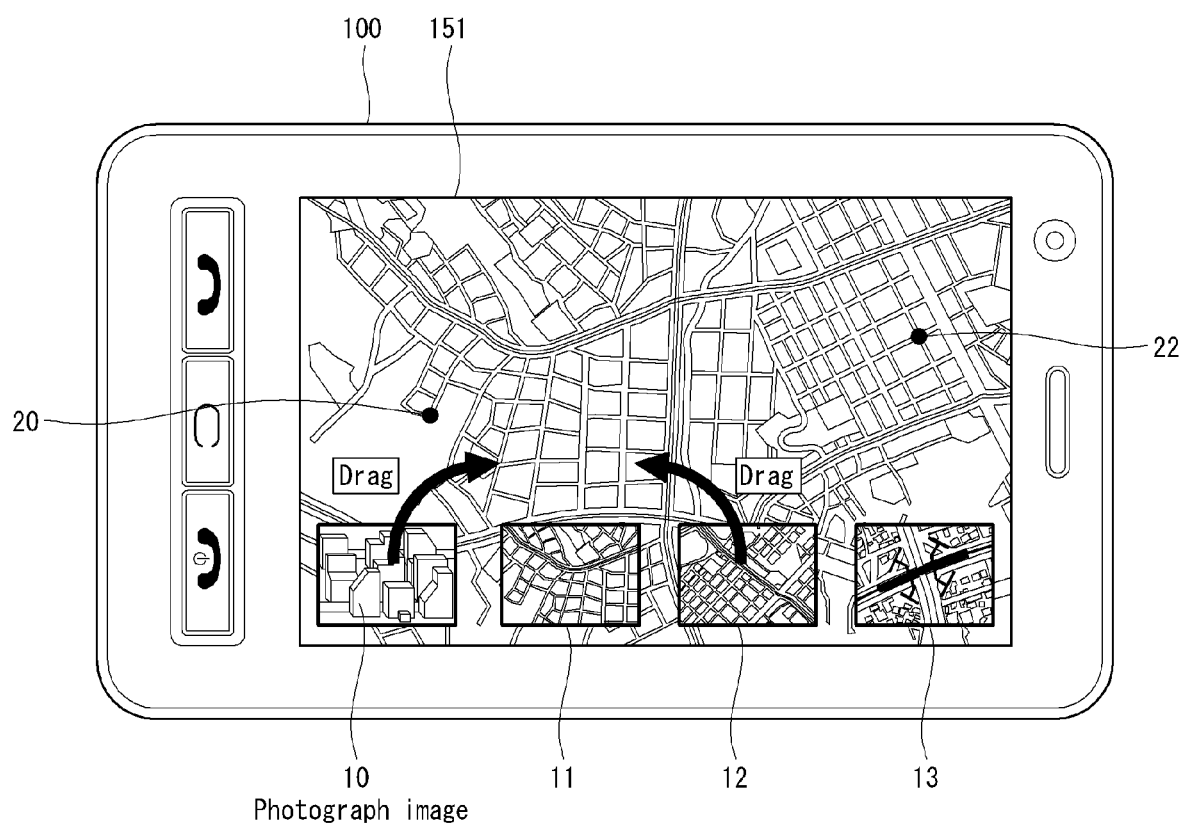
Figure 6B:
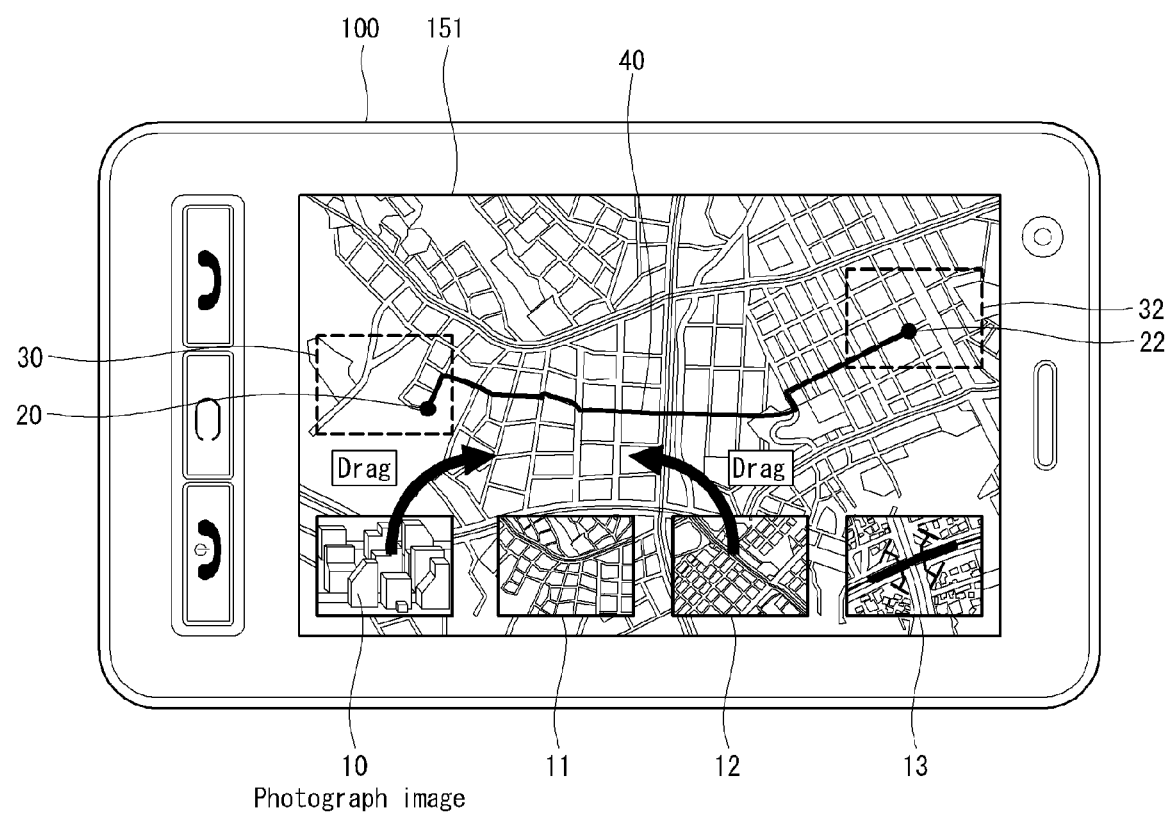

Referring to FIG. 5, the controller 180 can display a 2D or 3D map and shortcut icons on the display modules 151 (illustrated in FIG. 1) according to user's choice in operation S51. When the user wants to search a route between predetermined two points on the map, the user drags shortcut icons 10 and 12 corresponding to the predetermined two points among the shortcut icons 10, 11, 12 and 13 displayed on the map displayed on the display module 151 to the map through touch or proximity input, as illustrated in FIG. 6A. Then, the controller 180 moves the map image and adjusts the size of the map image such that the two shortcut points 20 and 22 indicated by the shortcut icons 10 and 12 selected by the user are displayed on the display module 151, executes a route search application to search the route between the two shortcut points 20 and 22 and displays the searched route 40 on the map, as illustrated in FIG. 6B and steps S52, S53 and S54 of FIG. 5. The controller 180 can display the positions of the selected two shortcut points 20 and 22 as dotted lines and 32 (FIG. 6B), photographs, videos or icons together with the searched route 40.

When the user drags a shortcut icon indicating a point other than the two shortcut points 20 and 22 forming the route to the route displayed on the map by using touch or proximity input, the controller 180 determines that an intermediate passing-through point 23 is added to the searched route 40 between the two shortcut points 20 and 22, executes the route search application to search a new route including the intermediate passing-through point 23 and displays the searched new route 43 including the intermediate passing-through point 23 on the map, as illustrated in FIG. 6C (FIG. 5, S55, S56 and S57). The controller 180 can display the positions of the multiple shortcut points 20, 22 and 23 selected by the user, which includes the intermediate passing-through point 23, as dotted lines 30, 32, and 33, photographs, videos and icons together with the new route.

Figure 6D:
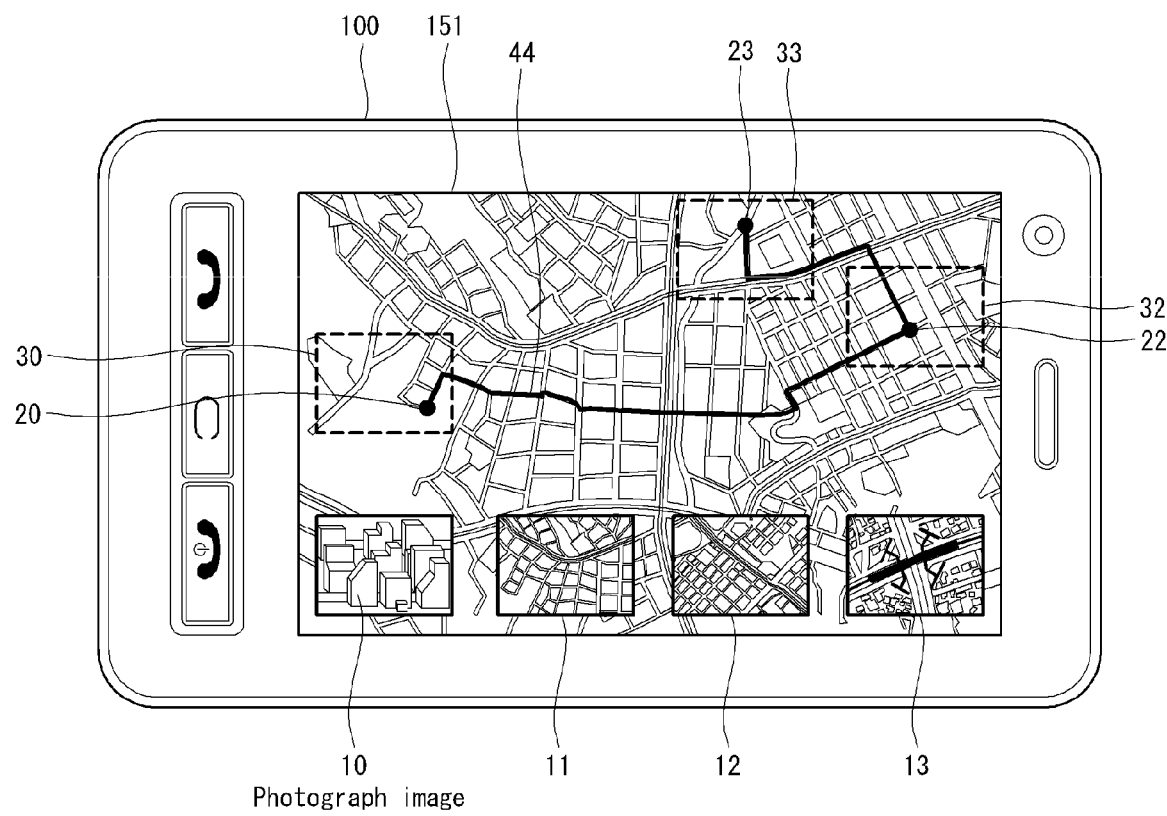

When the user wants to change the intermediate passing-through point, the user moves one of the multiple points indicated on the map onto the route 43 through touch or proximity input, as illustrated in FIG. 6C. Then, the controller 180 recognizes that the intermediate passing-through point is changed 22, searches a new route including the changed intermediate passing-through point 22 and displays the new route 44 including the changed intermediate passing-through point 22 on the map, as illustrated in FIG. 6D and steps S58, S59 and S60 of FIG. 5. The controller 180 can display the multiple points including the changed intermediate passing-through point 22 selected by the user as dotted lines 30, 32, and 33, photographs, videos or icons together with the searched route.

The controller 180 can display the outline of a shortcut icon selected by the user differently from those of other shortcut icons or display the selected shortcut icon by using a pointer in response to a user input through the user input unit 130. In this case, the user can select the shortcut icons corresponding to the points forming the route to be searched by using the user input unit 130, such as a key pad, a dome switch, a touch pad, a jog wheel, a jog switch, a track ball or a joystick, or motion of the mobile terminal 100 (FIGS. 5, S52, S55 and S58).

FIGS. 7A, 7B, 8A, 8B, 9A and 9B illustrate examples of process of registering a desired point as a shortcut point on a map displayed on the mobile terminal 100 or in a photo/video album.

Figure 7A:
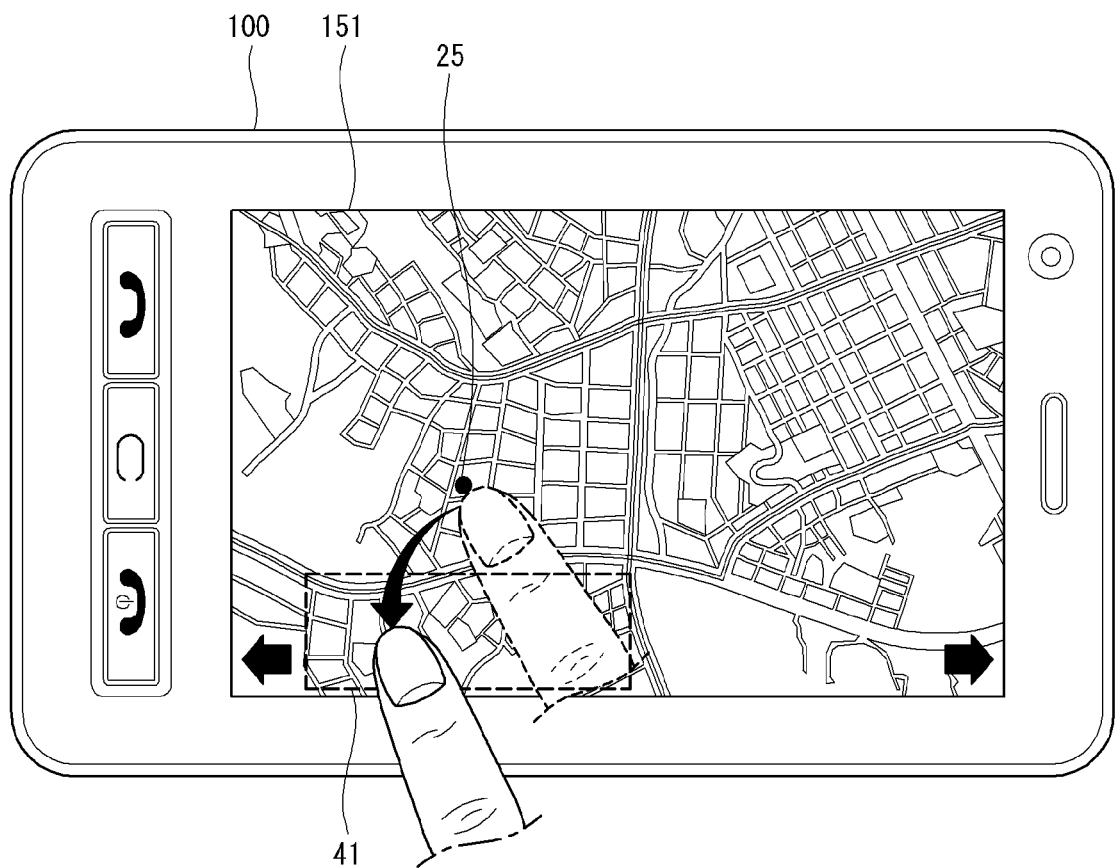
FIGS. 7A, 7B, 8A, 8B, 9A and 9B illustrate a process of registering a desired point in a photograph/video album as a shortcut point.
Figure 7B:
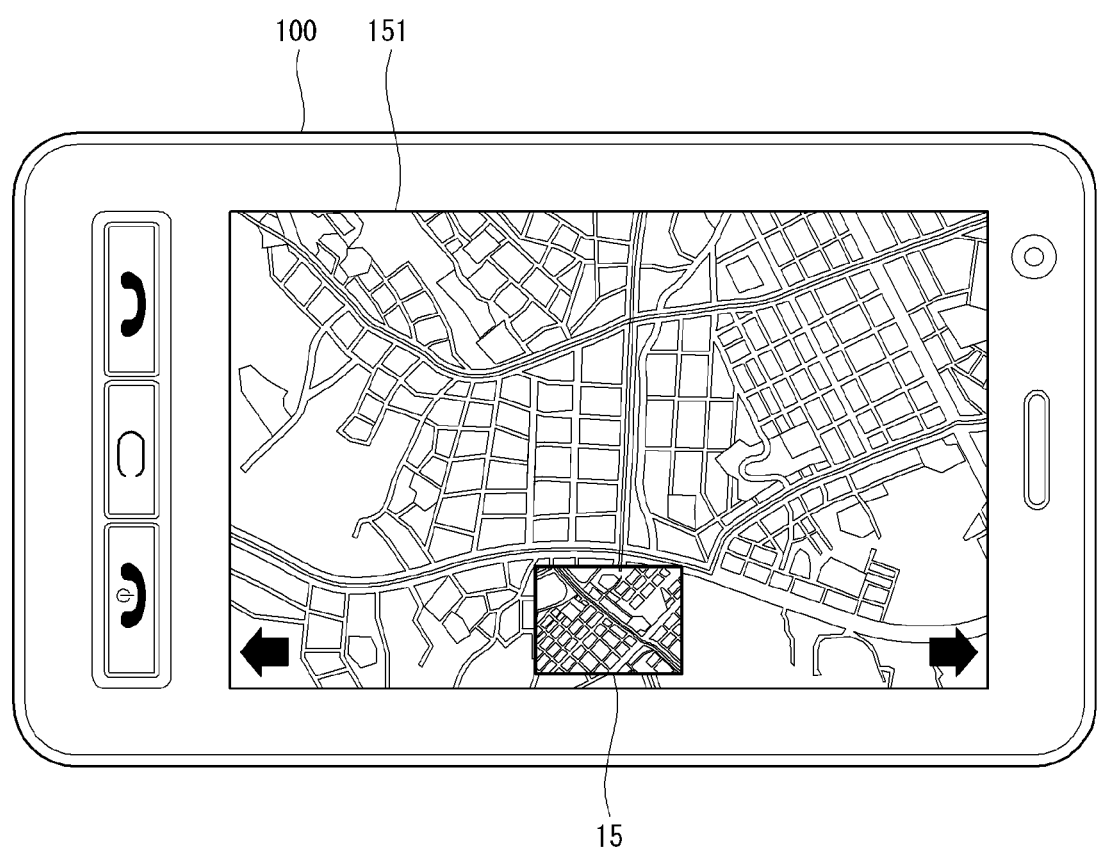

The user touches or proximity-drags a desired point on the map displayed on the display module 151 of the mobile terminal 100 to a predetermined shortcut registration position 41, as illustrated in FIG. 7A. The controller 180 registers position information of the point selected by the user as a shortcut and displays a shortcut icon 15 corresponding to the selected point on the map, as illustrated in FIG. 7B. The shortcut icon can be indicated in the form of a video, text, additionally designed image or combination thereof.

Figure 8A:
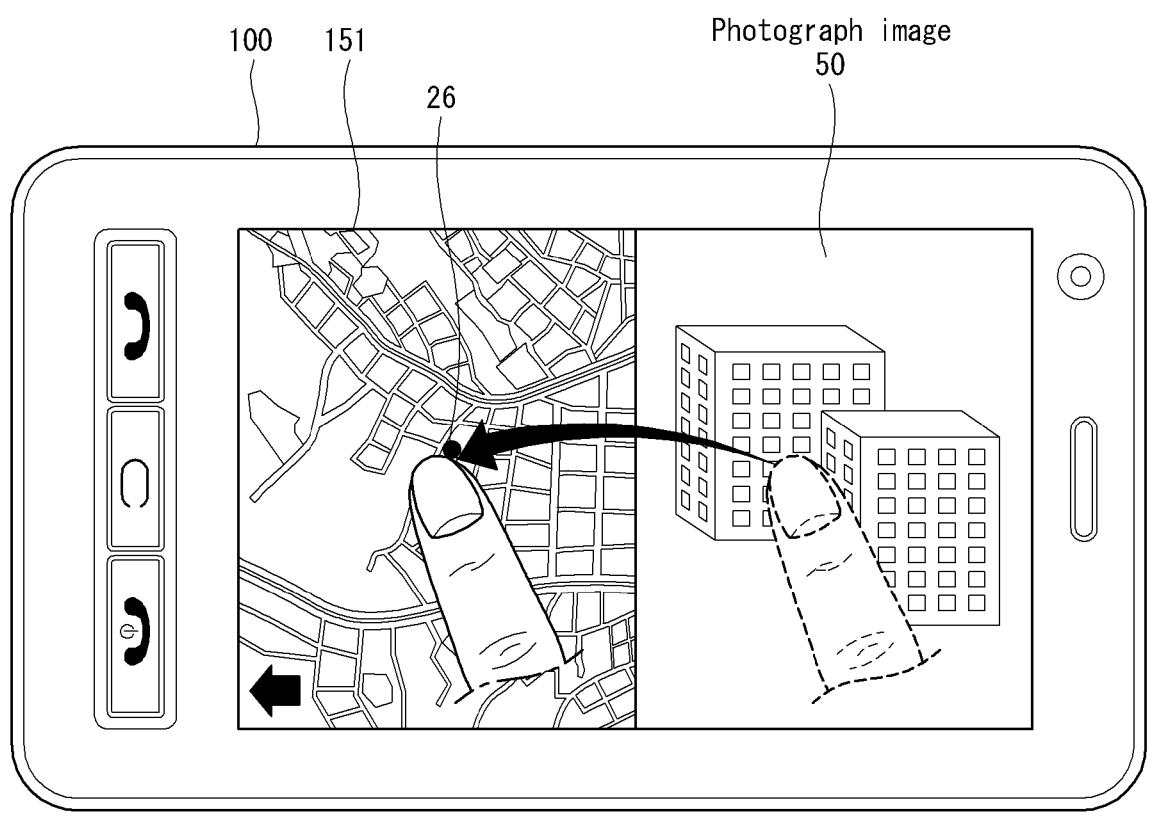
Figure 8B:
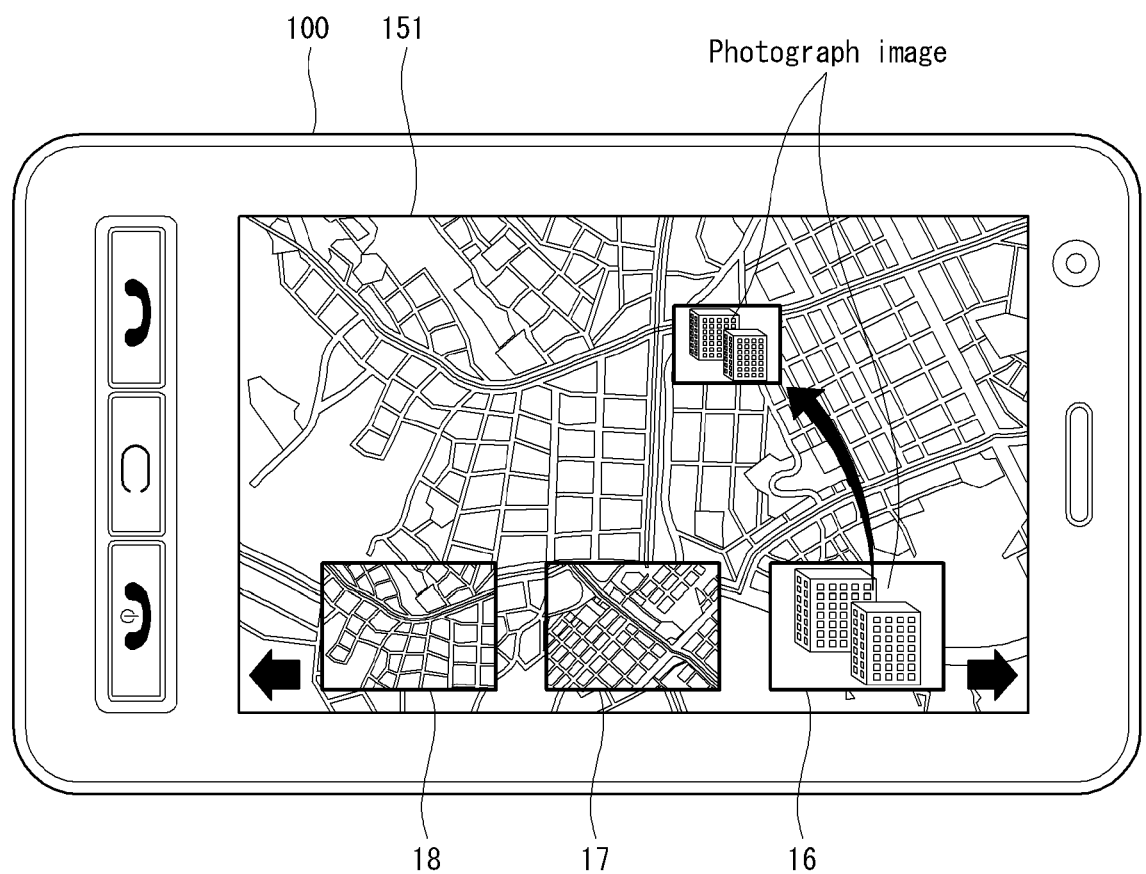

The controller 180 can display the map on the display module 151 and execute a photo/video viewer application according to user's choice. In this case, the display screen of the display module 151 is logically divided as illustrated in FIG. 8A, the map is displayed on one of the divided parts and a photograph/video image is displayed on the other one. When the user moves the displayed photograph/video image 50 to a point 26 to be designated as a shortcut point on the map through touch or proximity dragging, as illustrated in FIG. 8A, the controller 180 registers the point 26 selected by the user as a shortcut point and displays the photograph/video image 50 selected by the user as a shortcut icon 16, as illustrated in FIG. 8B.

Figure 9A:
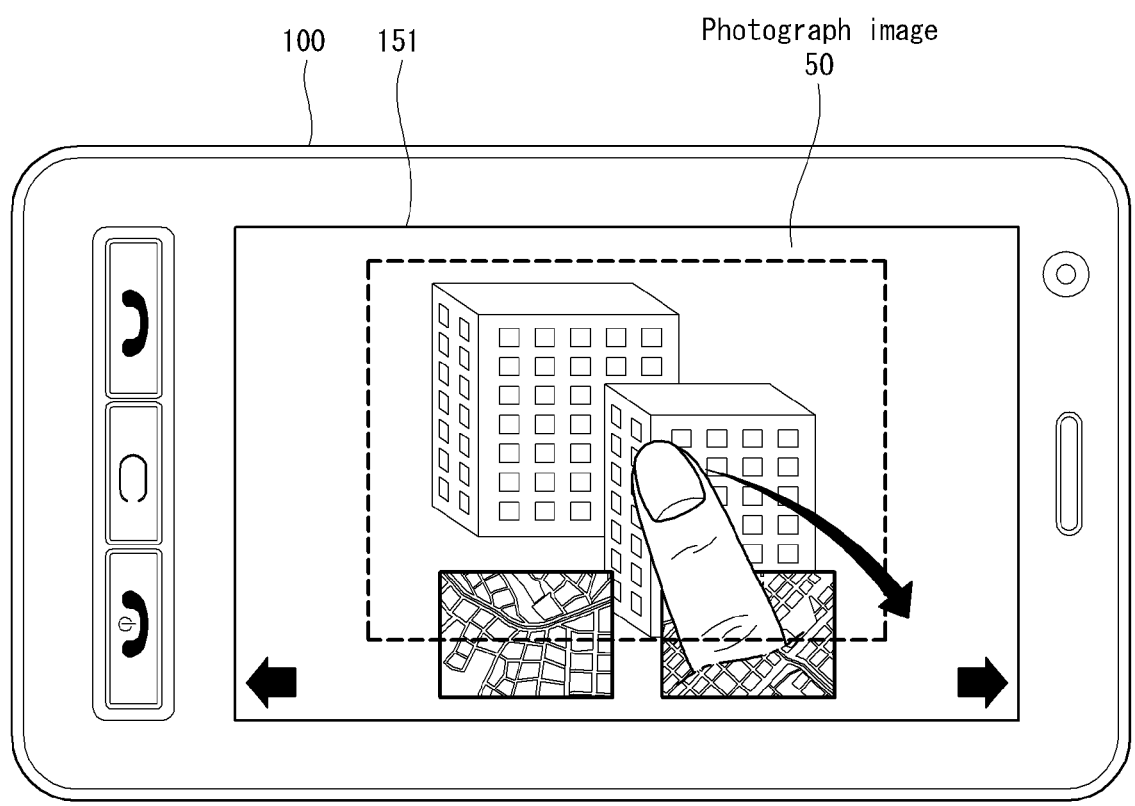
Figure 9B:
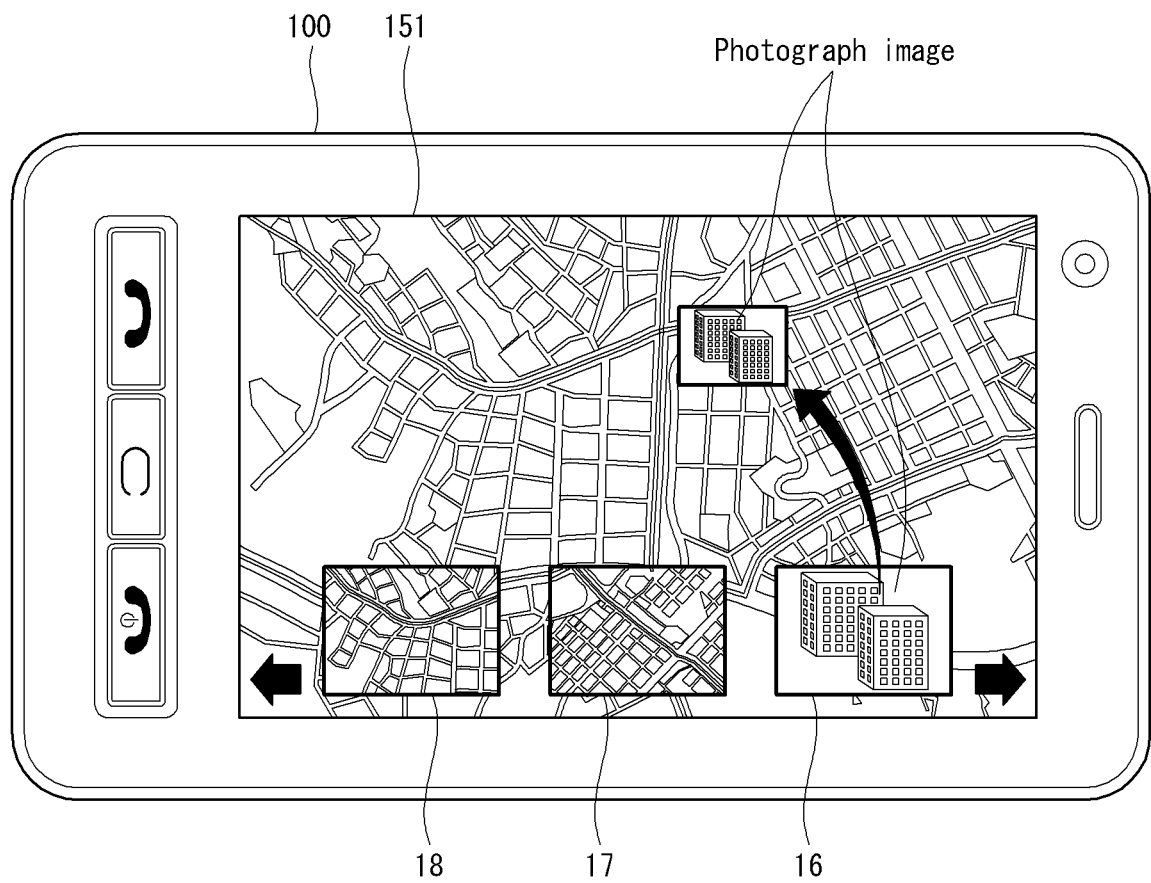

The user can register a desired point in a photograph/video album to as a shortcut, as illustrated in FIG. 9A. The controller 180 executes the photograph/video viewer application according to user's choice to display a photograph/video image 50 on the display module 151. If the photograph/video file corresponding to the photograph/video image 50 includes position information, for instance, EXIF information, the user can register a shortcut only by selecting the photograph/video image 50 displayed on the display module 151 through touch or proximity input. The controller 180 reads position information of the photograph/video image 50 selected by the user, registers a shortcut point on the map, which corresponds to the coordinate value of the read position information, and displays the shortcut icon 16 corresponding to the photograph/video image 50 on the map, as illustrated in FIG. 9B.

FIGS. 10A through 10E illustrate a method for controlling a map using a shortcut icon.

Figure 10A:
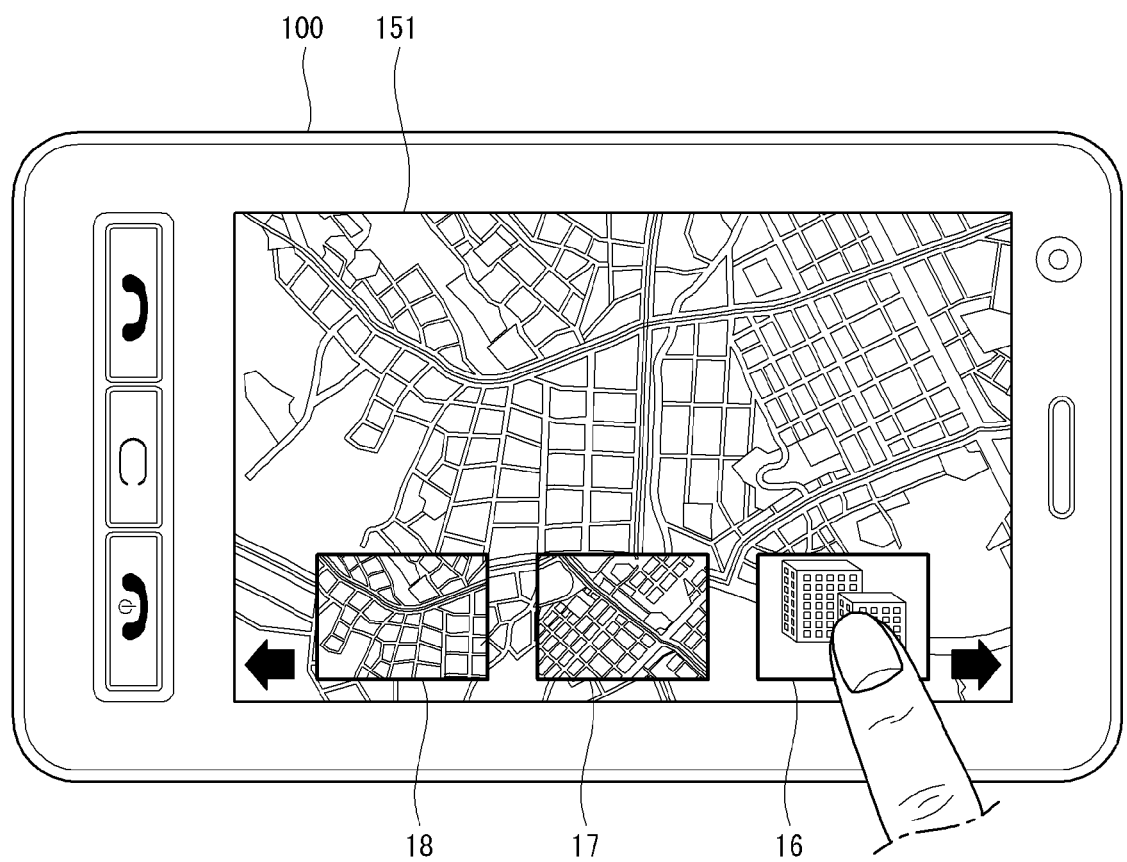
FIGS. 10A through 10E illustrate a map controlling method using a shortcut icon.
Figure 10B:
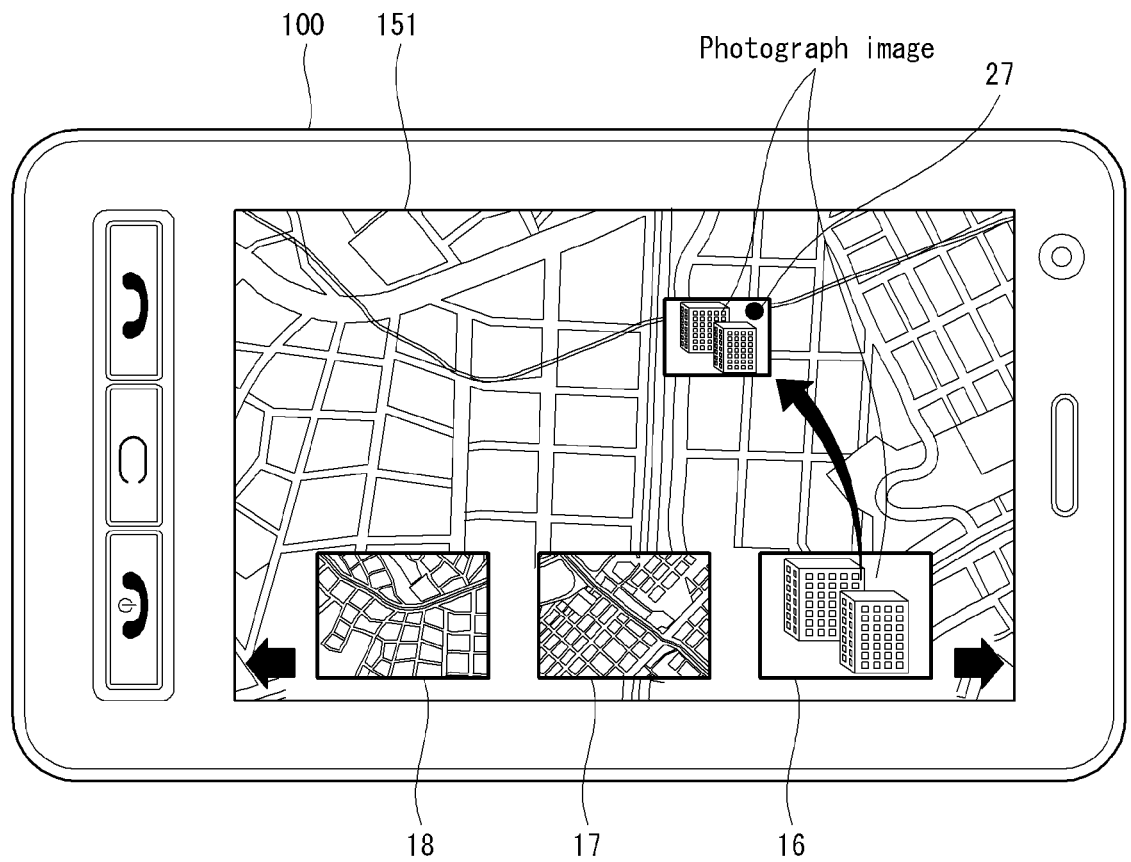
Figure 10C:
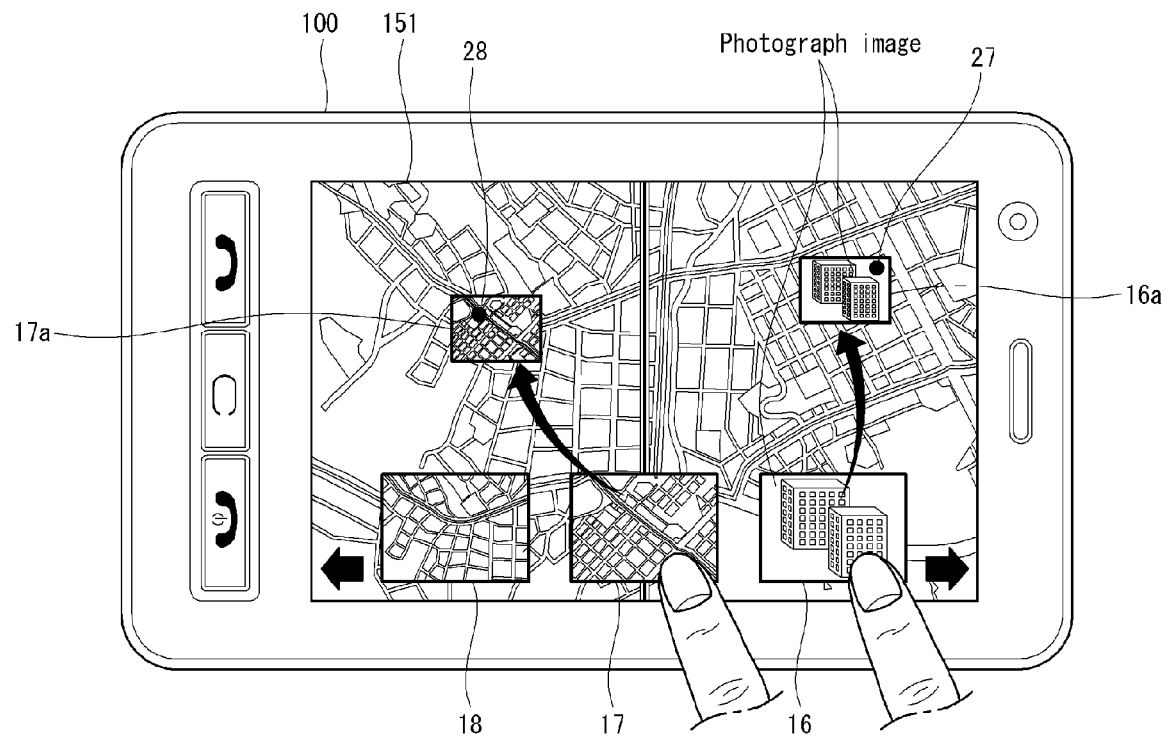
Figure 10D:
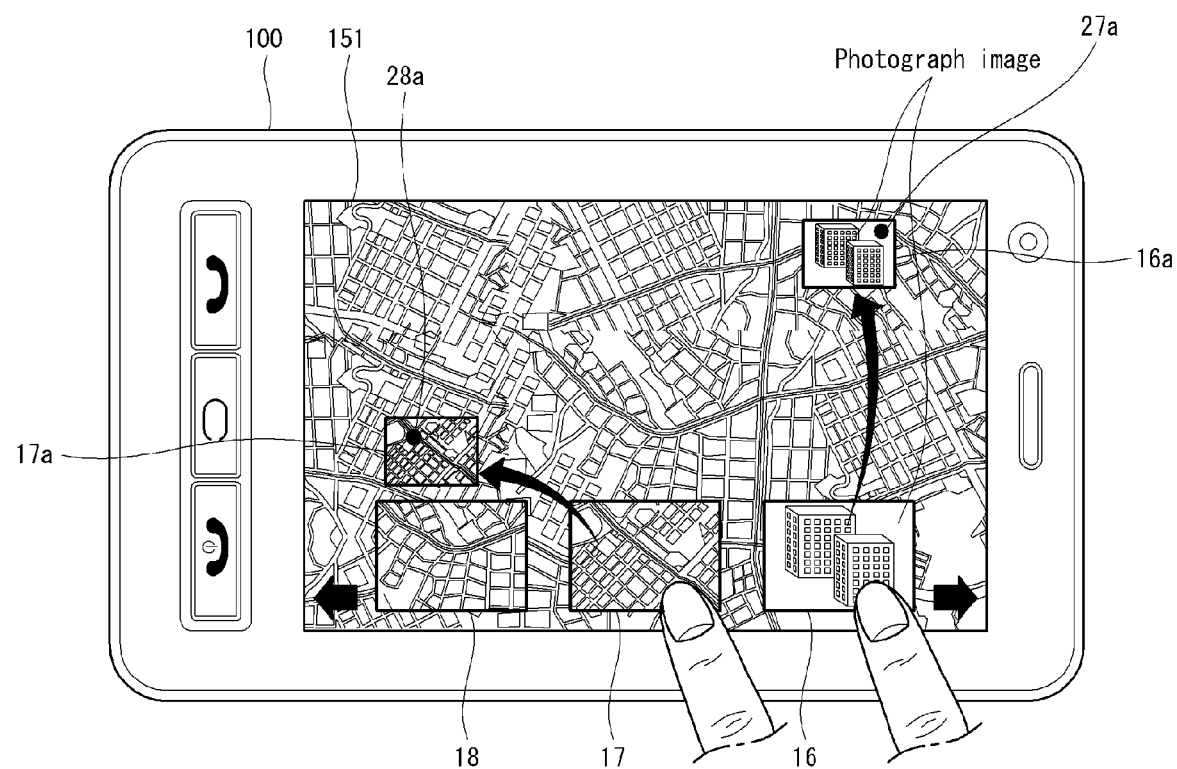
Figure 10E:
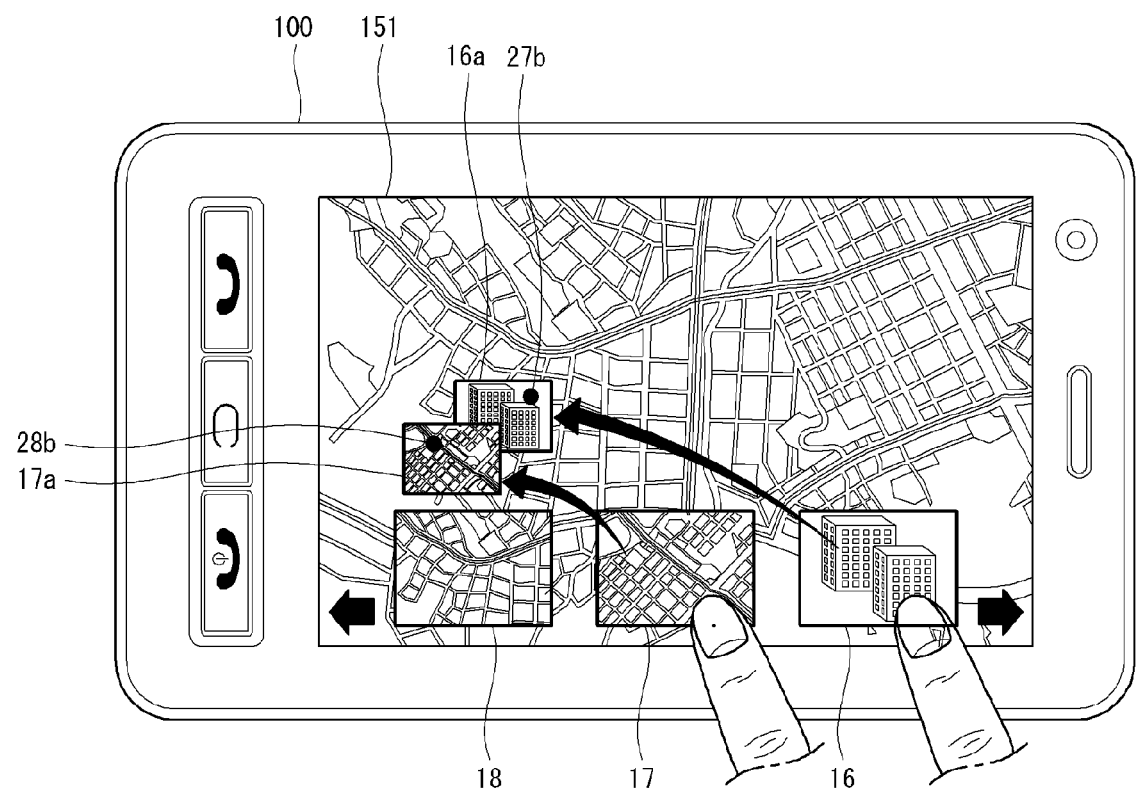

When the user selects a shortcut icon 16 on the map as illustrated in FIGS. 10A and 10B, the controller 180 searches map image data for coordinates 27 indicated by the selected shortcut icon 16. Furthermore, as illustrated in FIG. 10B, the controller 180 magnifies a map area including the coordinates 27 indicated by the selected shortcut icon 16 and displays the magnified map area on the display module 151. The user can drag two or more shortcut icons to the map simultaneously or at intervals within a predetermined time to select the shortcut icons. When the user selects the multiple shortcut icons 16 and 17, the controller 180 logically divides the display screen of the display module 151, respectively displays maps, which respectively include coordinates 27 and 28 indicated by the shortcut icons 16 and 17, on the divided parts of the display screen of the display module 151 and displays shortcut icon images 16a and 17a respectively corresponding to the shortcut icons 16 and 17 on points 27 and 28 respectively indicated by the shortcut icons and 17, as illustrated in FIG. 10C. Otherwise, the controller 180 can adjust the size of the map image such that the points 27a and 28a respectively indicated by the shortcut icons 16 and 17 selected by the user are displayed on the display screen of the display module 151 and display the shortcut icon images 16a and 17a on the points 27a and 28a respectively indicated by the shortcut icons 16 and 17, as illustrated in FIG. 10D. If the points respectively indicated by the shortcut icons selected by the user are close to each other, the controller 180 can search a map including the points 27b and 28b indicated by the shortcut icons 16 and 17 selected by the user, display the searched map on the display module 151 and display the shortcut icon images 16a and 17a on the points 27b and 28b indicated by the shortcut icons 16 and 17 on the map, as illustrated in FIG. 10E. Accordingly, the user can be immediately aware of that the points indicated by the shortcut icons are close to each other from the shortcut icon images. Furthermore, the user can be immediately aware of the distance between the points indicated by the shortcut icons from the distance between the shortcut icons displayed on the map.

FIGS. 11A, 11B, 12A, 12B, 13A, 13B, 14A and 14B illustrate a route searching and displaying method using a shortcut icon.

Figure 11A:
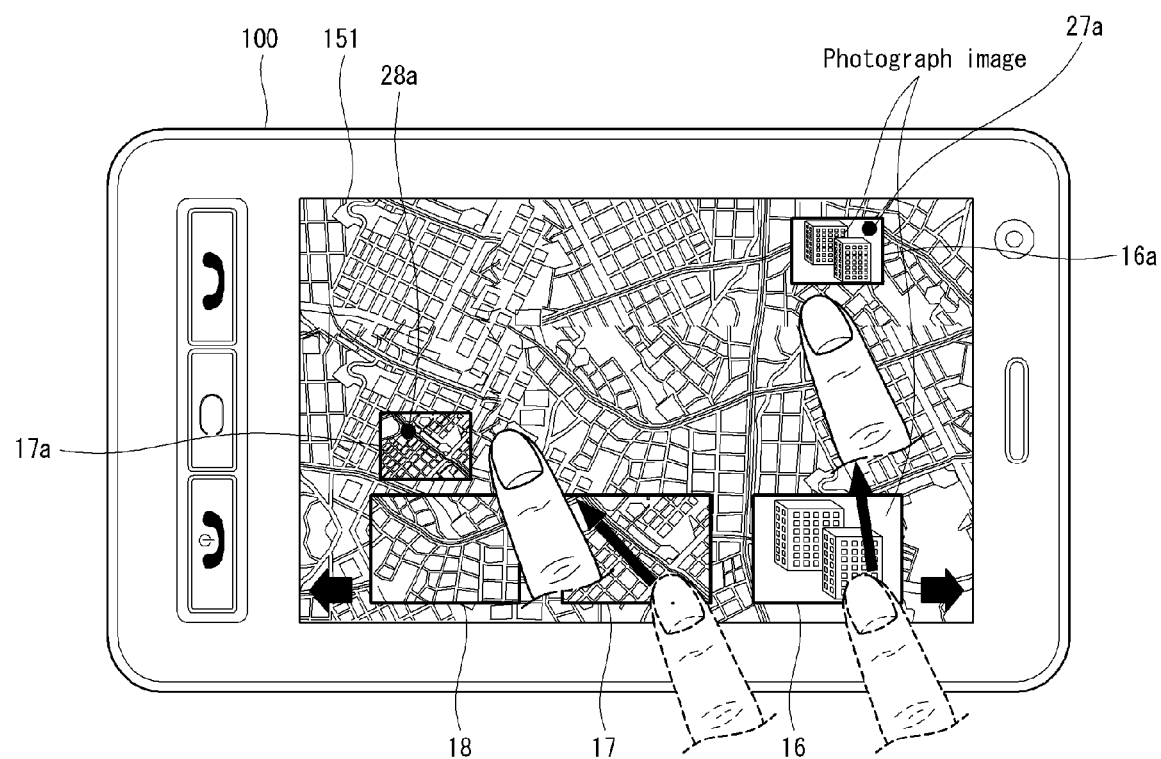
FIGS. 11A, 11B, 12A, 12B, 13A, 13B, 14A and 14B illustrate a method of searching and displaying a route using a shortcut icon.
Figure 11B:
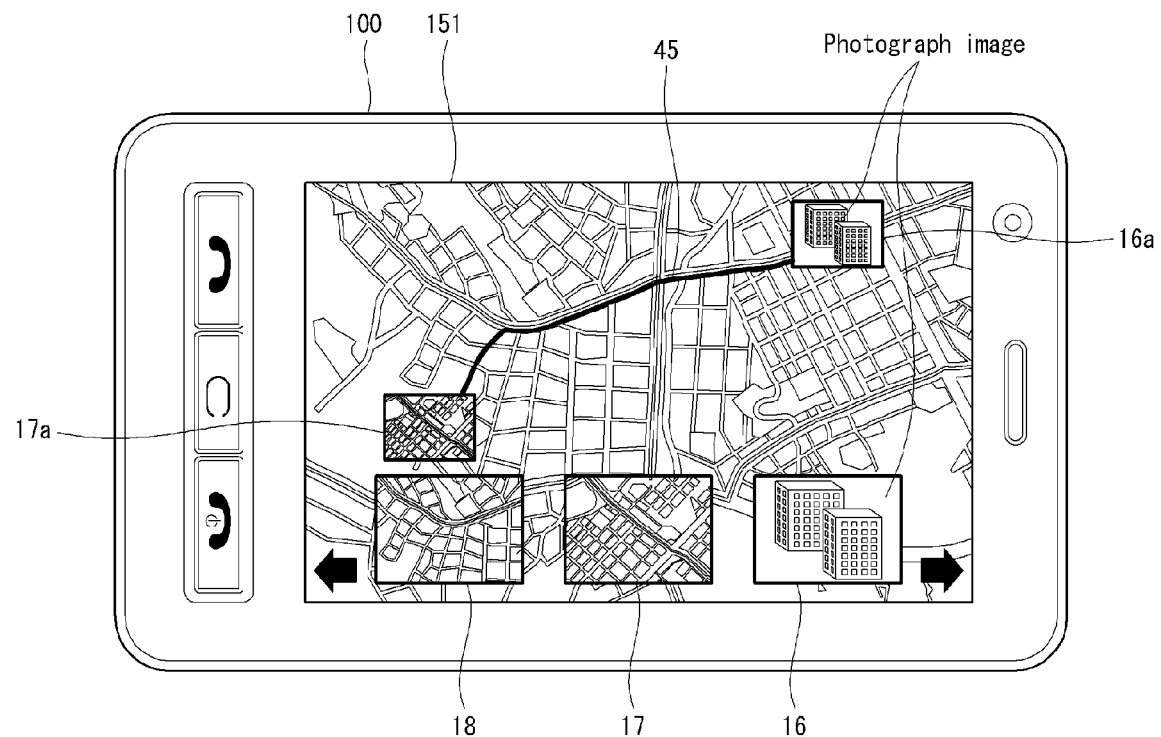

The user touches or proximity-drags two shortcut icons 16 and 17 among the shortcut icons 16, 17 and 18 displayed on the map to the map when the user wants to search a route between two points respectively indicated by the two shortcut icons, as illustrated in FIG. 11A. The controller 180 searches the route between the two points 27a and 28a selected by the shortcut icons 16 and 17 and displays the searched route 45 on the map, as illustrated in FIG. 11B.

Figure 12A:
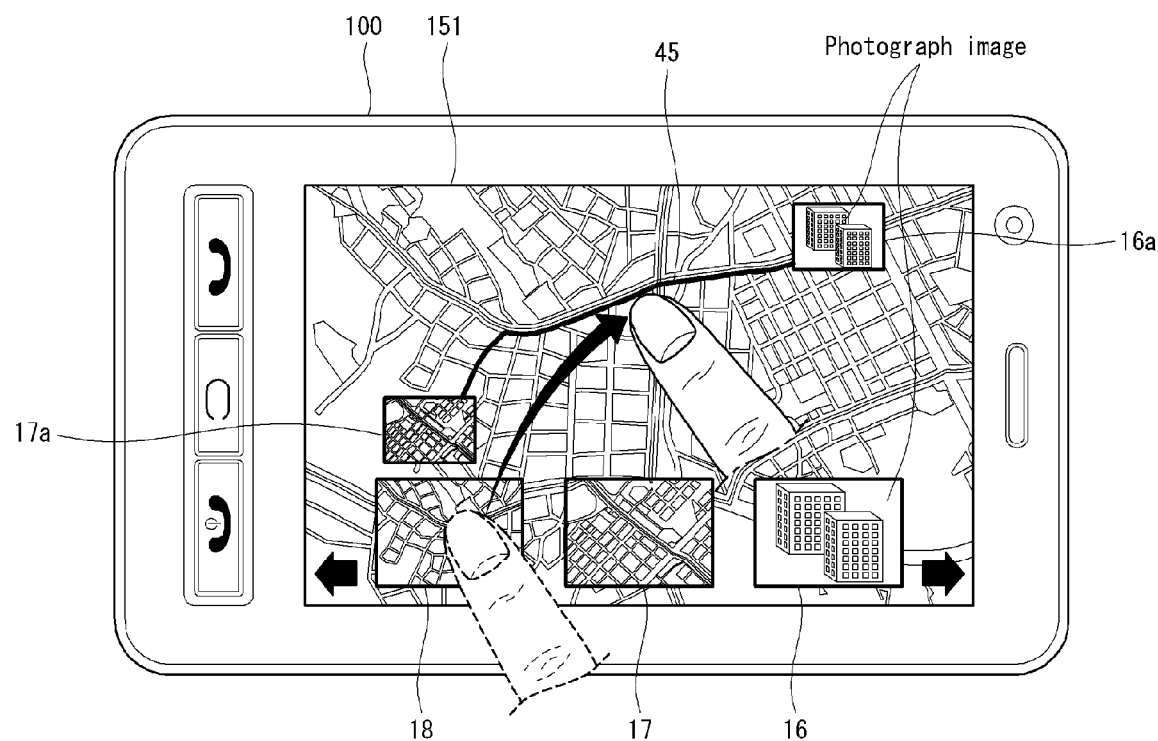
Figure 12B:
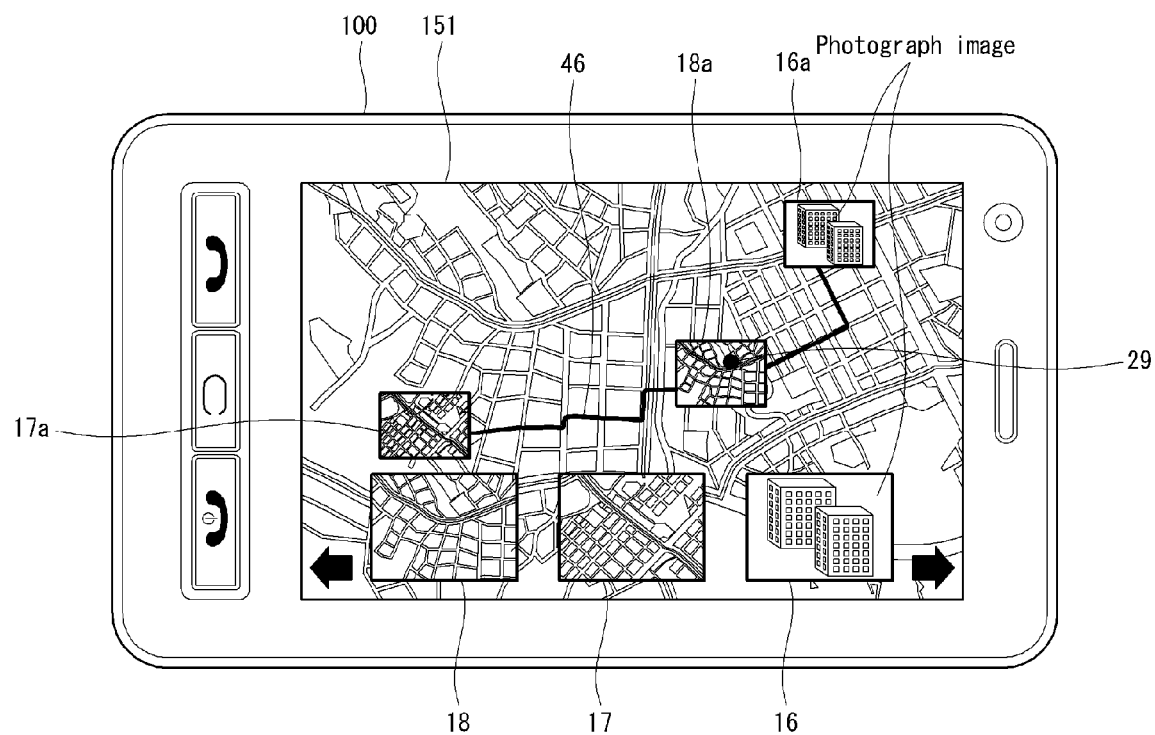

When the user wants to search a route including an immediate passing-through point, the user touches or proximity-drags a shortcut icon 18 indicating the intermediate passing-through point to the route 45 displayed on the map, as illustrated in FIG. 12A. Then, the controller 180 searches the map for coordinates of the intermediate passing-through point 29 selected by the user, searches the new route including the intermediate passing-through point 29 and displays the new route 46 including the intermediate passing-through point 29 on the map, as illustrated in FIG. 12B.

Figure 13A:
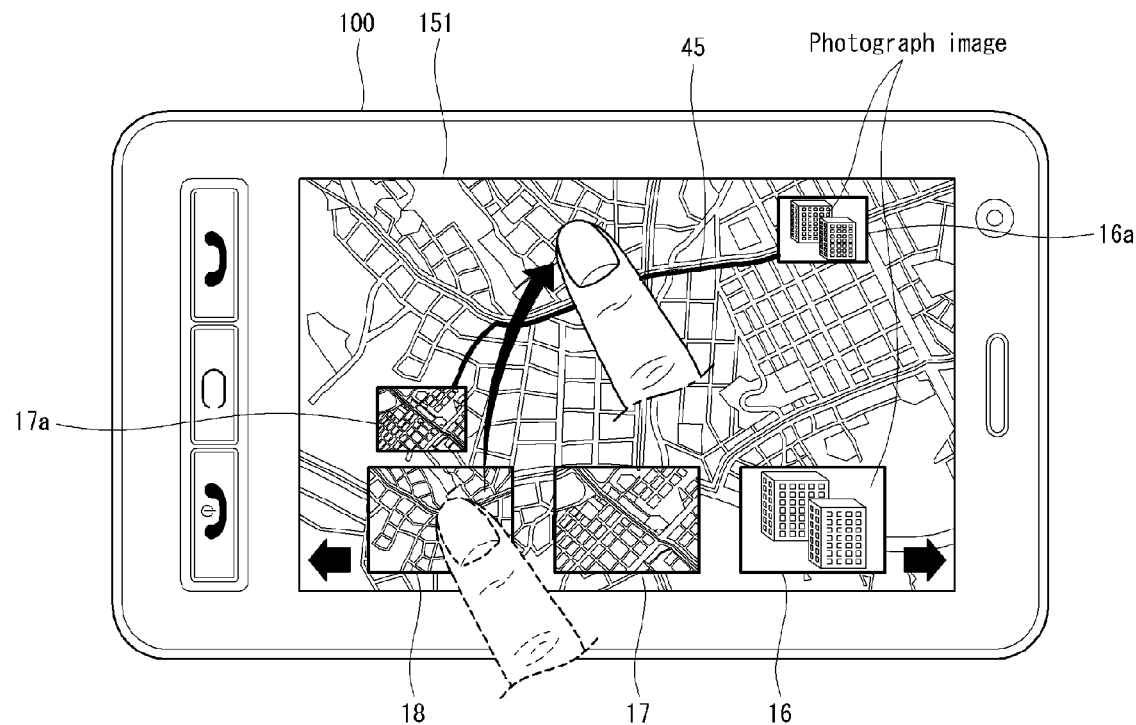
Figure 13B:
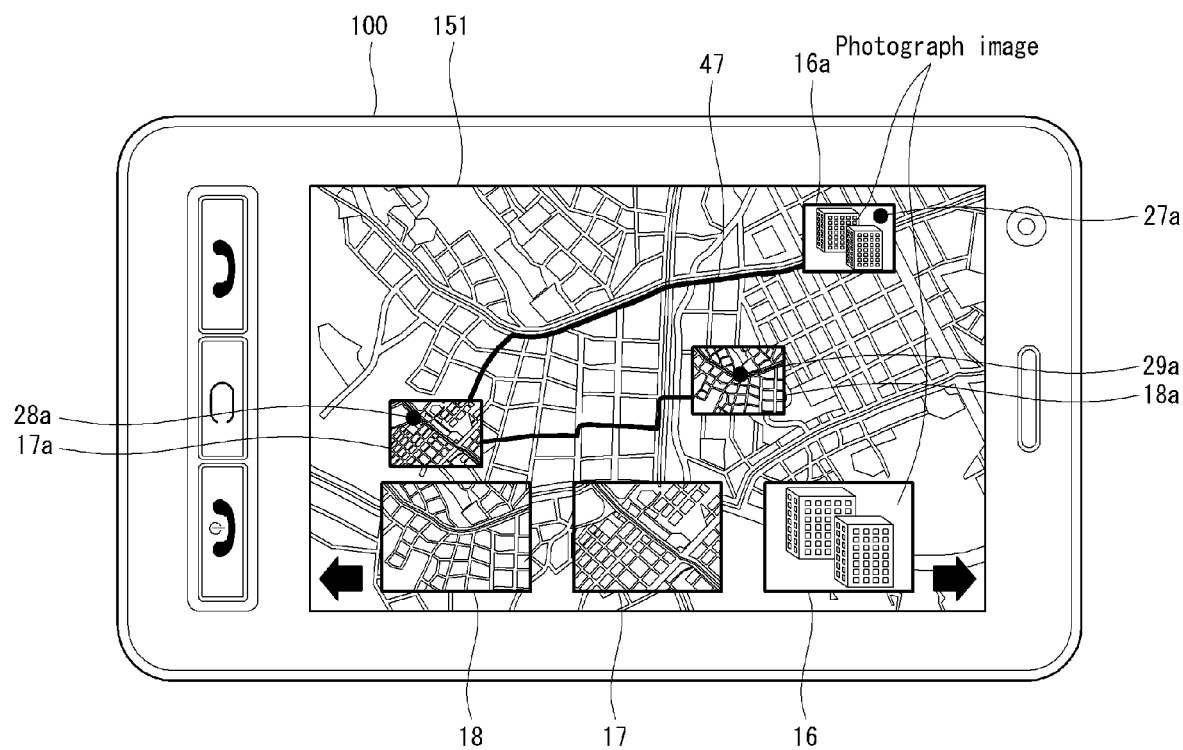
Figure 14A:
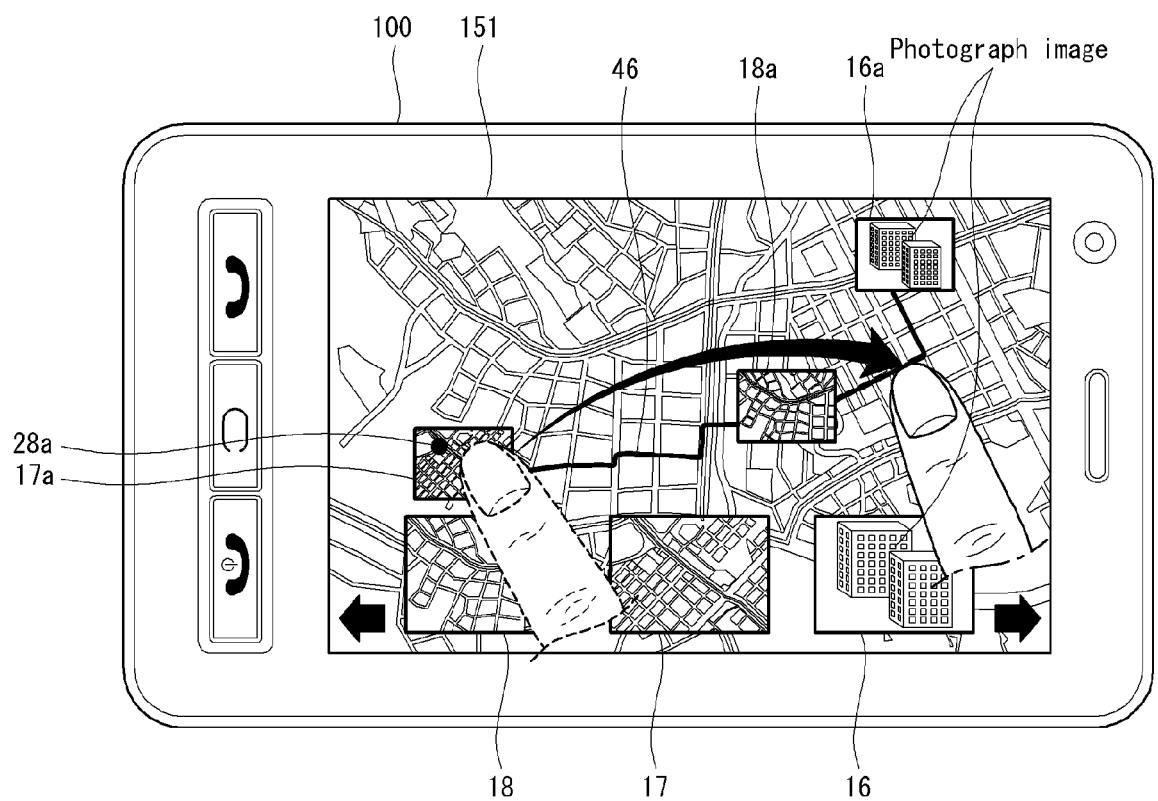
Figure 14B:
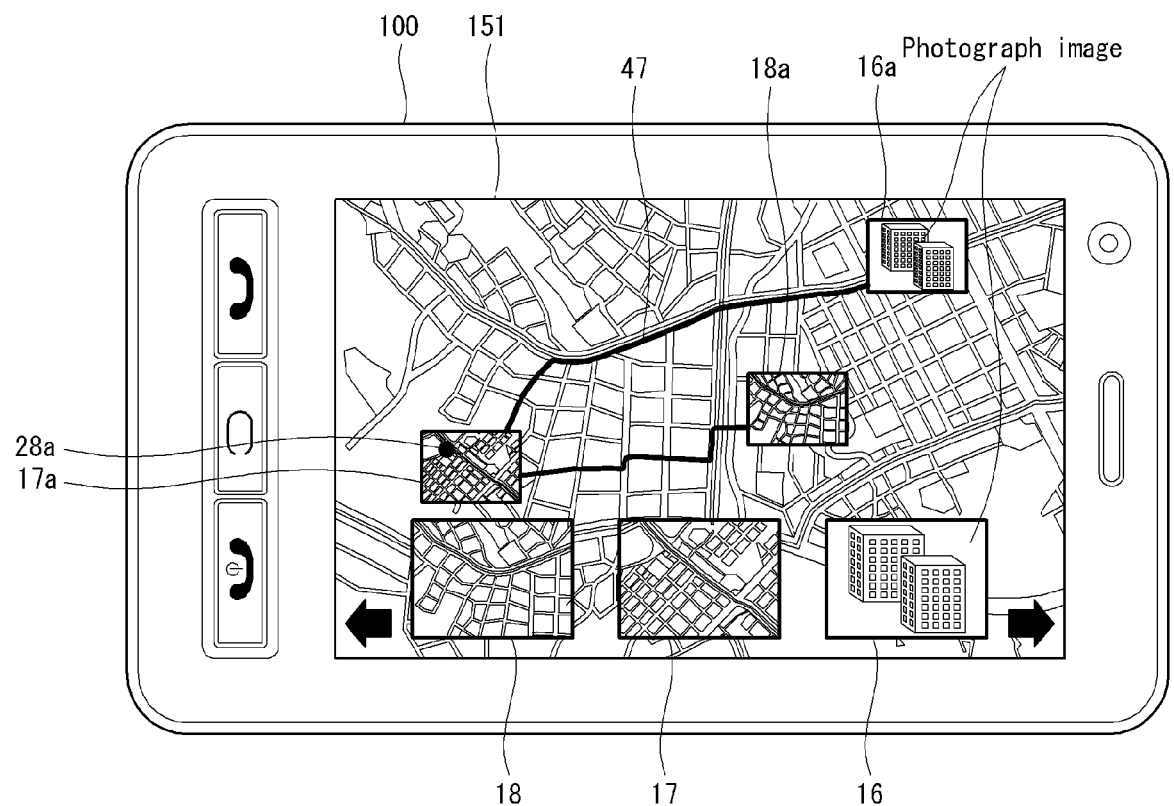

The user touches or drags a shortcut icon 18 indicating a new destination to the map when the user wants to change the previous destination, as illustrated in FIG. 13A. Then, the controller 180 searches a route between the starting point 27a of the previous route 45 and the new destination 29a selected by the user and displays the searched new route 47 including the intermediate passing-through point 28a corresponding to the previous destination on the map, as illustrated in FIG. 13B. Images of shortcut icons (shortcut images) 16a, 17a and 18a are reduced and copied to the starting point 27a, the intermediate passing-through point 28a and the destination 29a. When the user wants to change the intermediate passing-through point, the user touches or drags the corresponding shortcut image 17a displayed on the map to display the shortcut image on the existing route 46, as illustrated in FIG. 14A. Then, the controller 180 searches a route including an intermediate passing-through point 28a newly selected by the user and displays the new route 47 including the starting point and the changed intermediate passing-through point 28a on the map, as illustrated in FIG. 14B.

The aforementioned map controlling method can be applied to a 3D map as well as the 2D map illustrated in the figures.

The above-described method of controlling a map according to the present application can be written as computer programs in a computer readable recording medium.

The method of controlling a map according to the present application can be executed through software. In this case, the elements of the present application are code segments to perform the necessary tasks. The program or code segments can be stored in a processor readable medium or transmitted by a computer data signals embodied in a carrier wave over a transmission medium or communication link.

The computer readable recording medium is any data storage device that can store data which can be thereafter read by a computer system. Examples of the computer readable recording medium include read-only memory (ROM), random-access memory (RAM), CD-ROM, DVD±ROM, DVD-RAM, magnetic tapes, floppy disks, hard disks, and optical data storage devices. The computer readable recording medium can also be distributed over network coupled computer systems so that the computer readable code is stored and executed in a distributed fashion.

While the present application has been particularly shown and described with reference to exemplary embodiments thereof, it will be understood by those of ordinary skill in the art that various changes in form and details may be made therein without departing from the spirit and scope of the present application as defined by the following claims.

What is claimed is:

1. A method for controlling a map displayed in a mobile terminal, the method comprising:
    displaying the map on a touchscreen of the mobile terminal;
    receiving a first touch input on the displayed map for selecting a first location as a first shortcut;
    associating the first location with the first shortcut in response to receiving the first touch input;
    displaying a first shortcut icon associated with the first shortcut;
    receiving a selection of the first shortcut icon; and
    controlling an area of the map displayed on the touchscreen such that the displayed area includes the first location in response to selecting the first shortcut icon.

2. The method of claim 1, further comprising:
    receiving a second touch input on the displayed area of the map for selecting a second location as a second shortcut;
    associating the second location with the second shortcut in response to receiving the second touch input;
    displaying a second shortcut icon associated with the second shortcut;
    receiving a selection of the first shortcut icon and the second shortcut icon; and controlling the displayed area to include the first location and the second location in response to selecting the first shortcut icon and the second shortcut icon.

3. The method of claim 2, further comprising:
determining a first route between the first location and the second location when the first location and the second location are displayed; and
displaying the first route on the displayed area of the map.

4. The method of claim 3, further comprising:
receiving a third touch input on the displayed area of the map for associating a third location with a third shortcut, the third location being a location between the first location and the second location;
associating the third location with the third shortcut in response to receiving the third touch input;
displaying a third shortcut icon associated with the third shortcut;
determining a second route between the first location and the second location through the third location; and
displaying the second route on the displayed area of the map.

5. The method of claim 3, further comprising:
receiving a third touch input on the displayed area of the map for associating a third location with a third shortcut, the third location being a new start location or a new end location for the first route;
associating the third location with the third shortcut in response to receiving the third touch input;
displaying a third shortcut icon associated with the third shortcut;
determining a second route using the first location, the third location, and the second location; and
displaying the second route on the displayed area of the map.

6. The method of claim 5, further comprising:
generating thumbnail images of the first shortcut icon, the second shortcut icon, and the third shortcut icon; and
displaying the thumbnail image of the first shortcut icon at the first location, the thumbnail image of second shortcut icon at the second location, and the thumbnail image of the third shortcut icon at the third location.

7. The method of claim 1, wherein the first shortcut icon is selected via a direct touch input, a proximity touch input, or a user input device.

8. The method of claim 1, further comprising:
displaying an image associated with the first location as the first shortcut icon.

9. The method of claim 1, further comprising:
displaying an image, a portion of the map, or text as the first shortcut icon.

10. A mobile terminal comprising:
a touchscreen configured to display a map and to receive a first touch input on the displayed map to associate a first location with a first shortcut; and
a controller configured to:
associate the first location with the first shortcut in response to receiving the first touch input;
control the touchscreen to display a first shortcut icon associated with the first shortcut;
process a selection of the first shortcut icon via the touchscreen; and
control an area of the map displayed on the touchscreen such that the displayed area includes the first location when the first shortcut icon is selected.

11. The mobile terminal of claim 10, wherein:
the touchscreen is further configured to receive a second touch input on the displayed area of the map to associate a second location with a second shortcut; and
the controller is further configured to:
associate the second location with the second shortcut in response to receiving the second touch input;
control the touchscreen to display a second shortcut icon associated with the second shortcut;
process a selection of the first shortcut icon and second shortcut icon via the touchscreen; and
control the displayed area to include the first location and the second location when the first shortcut icon and the second shortcut icon are selected.

12. The mobile terminal of claim 11, wherein the controller is further configured to determine a first route between the first location and the second location and control the touchscreen to display the first route.

13. The mobile terminal of claim 12, wherein:
the touchscreen is further configured to receive a third touch input on the displayed area of the map to associate a third location with a third shortcut, the third location being a location between the first location and the second location; and
the controller is further configured to:
associate the third location with the third shortcut in response to receiving the third touch input;
determine a second route between the first location and the second location via the third location; and
control the touchscreen to display a third shortcut icon associated with the third shortcut and to display the second route.

14. The mobile terminal of claim 12, wherein:
the touchscreen is further configured to receive a third touch input on the displayed area of the map to associate a third location with a third shortcut, the third location being a new start location or a new end location for the first route, and
the controller is further configured to:
associate the third location with the third shortcut in response to receiving the third touch input;
determine a second route using the first location, the third location, and the second location; and
control the touchscreen to display a third shortcut icon associated with the third shortcut and to display the second route.

15. The mobile terminal of claim 14, wherein the controller is further configured to generate thumbnail images of the first shortcut icon, the second shortcut icon, and the third shortcut icon and control the touchscreen to display the thumbnail image of the first shortcut icon at the first location, the thumbnail image of second shortcut icon at the second location, and the thumbnail image of the third shortcut icon at the third location.

16. The mobile terminal of claim 10, wherein the first shortcut icon is selected via a direct touch input, a proximity touch input, or a user input unit.

17. The mobile terminal of claim 10, wherein the controller is further configured to control the touchscreen to display an image associated with the first location as the first shortcut icon.

18. The mobile terminal of claim 10, wherein the controller is further configured to control the touchscreen to display an image, a portion of the map, or text as the first shortcut icon.

* * * * *